United States Patent
Ryu et al.

(10) Patent No.: US 11,265,275 B2
(45) Date of Patent: *Mar. 1, 2022

(54) ELECTRONIC DEVICE AND METHOD FOR IMAGE CONTROL THEREOF

(71) Applicant: SAMSUNG ELECTRONICS CO., LTD., Suwon-si (KR)

(72) Inventors: Young-Hwan Ryu, Yongin-si (KR); Dong-Ho Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,892

(22) Filed: Apr. 5, 2021

(65) Prior Publication Data

US 2021/0226906 A1 Jul. 22, 2021

Related U.S. Application Data

(63) Continuation of application No. 16/785,699, filed on Feb. 10, 2020, now Pat. No. 10,972,414, which is a (Continued)

(30) Foreign Application Priority Data

Dec. 24, 2015 (KR) .................. 10-2015-0186555

(51) Int. Cl.
*G06F 15/16* (2006.01)
*H04L 51/10* (2022.01)
(Continued)

(52) U.S. Cl.
CPC ............ *H04L 51/10* (2013.01); *G06F 3/0482* (2013.01); *G06F 3/04817* (2013.01); *G06F 3/14* (2013.01);
(Continued)

(58) Field of Classification Search
None
See application file for complete search history.

(56) References Cited

U.S. PATENT DOCUMENTS 8,867,849 B1 10/2014 Kirkham et al.
9,635,267 B2 4/2017 Lee
(Continued)

FOREIGN PATENT DOCUMENTS

CN 1479250 A 3/2004
CN 103986646 A 8/2014
(Continued)

OTHER PUBLICATIONS

U.S. Appl. No. 16/785,699, filed Feb. 10, 2020; RYU et al.
(Continued)

*Primary Examiner* — Quang N Nguyen
(74) *Attorney, Agent, or Firm* — Nixon & Vanderhye P.C.

(57) ABSTRACT

An electronic device can include a display, a communication interface comprising communication circuitry, and a processor comprising processing circuitry. The processor can be configured to receive a plurality of images comprising a first image and a second image in a first order from an external electronic device using the communication circuitry of the communication interface, arrange the first image and the second image in a second order based on first property information corresponding to the first image and second property information corresponding to the second image, and arrange and display the first image and the second image in the second order through the display.

16 Claims, 20 Drawing Sheets

Related U.S. Application Data continuation of application No. 15/368,843, filed on Dec. 5, 2016, now Pat. No. 10,560,409.

(51) Int. Cl.

| | | |
|---|---|---|
| *G06F 3/14* | (2006.01) | |
| *G06F 3/0482* | (2013.01) | |
| *G06F 3/04817* | (2022.01) | |
| *G06F 16/583* | (2019.01) | |
| *G06F 16/54* | (2019.01) | |
| *G06F 3/04842* | (2022.01) | |
| *G06F 3/04855* | (2022.01) | |
| *G06F 3/04883* | (2022.01) | |
| *H04N 5/225* | (2006.01) | |

(52) U.S. Cl.
CPC .......... *G06F 3/1423* (2013.01); *G06F 3/1454* (2013.01); *G06F 16/54* (2019.01); *G06F 16/583* (2019.01); *G06F 3/04842* (2013.01); *G06F 3/04855* (2013.01); *G06F 3/04883* (2013.01); *G09G 2370/022* (2013.01); *G09G 2370/12* (2013.01); *G09G 2370/16* (2013.01); *H04N 5/2258* (2013.01)

(56) References Cited

U.S. PATENT DOCUMENTS

| | | | |
|---|---|---|---|
| 9,648,140 B2 | 5/2017 | Urakawa | |
| 9,684,440 B2 | 6/2017 | Stepanov | |
| 10,180,767 B2* | 1/2019 | Lee ..................... | G06F 3/0486 |
| 10,387,891 B2* | 8/2019 | Shoemaker ........ | G06Q 30/0257 |
| 10,560,409 B2 | 2/2020 | Ryu et al. | |
| 10,972,414 B2 | 4/2021 | Ryu et al. | |
| 2002/0001468 A1 | 1/2002 | Kaku | |
| 2005/0246374 A1 | 11/2005 | Blinn et al. | |
| 2006/0052118 A1 | 3/2006 | Furon et al. | |
| 2006/0192880 A1 | 8/2006 | Takahira et al. | |
| 2007/0168431 A1 | 7/2007 | Lyle et al. | |
| 2010/0085318 A1 | 4/2010 | Lee | |
| 2010/0085435 A1 | 4/2010 | Tokai | |
| 2010/0185627 A1 | 7/2010 | Se | |
| 2011/0080424 A1 | 4/2011 | Peters et al. | |
| 2013/0147914 A1 | 6/2013 | Park | |
| 2013/0198176 A1 | 8/2013 | Kim | |
| 2013/0201123 A1 | 8/2013 | Jung | |
| 2013/0212506 A1 | 8/2013 | Aoshima | |
| 2014/0298164 A1 | 10/2014 | Terayoko | |
| 2015/0033151 A1 | 1/2015 | Lim | |
| 2015/0042852 A1 | 2/2015 | Lee | |
| 2015/0172240 A1 | 6/2015 | Back | |
| 2015/0278595 A1 | 10/2015 | Momoki et al. | |
| 2015/0293943 A1 | 10/2015 | Kim | |
| 2015/0309691 A1* | 10/2015 | Seo ........................ | G06F 3/0484 |
| | | | 345/173 |
| 2015/0356949 A1 | 12/2015 | Kim | |
| 2016/0063679 A1* | 3/2016 | Teshima ............. | H04N 1/00411 |
| | | | 345/667 |
| 2016/0085423 A1 | 3/2016 | Kobayashi | |
| 2016/0142580 A1 | 5/2016 | Sakahara | |
| 2016/0154776 A1 | 6/2016 | Miyake | |
| 2017/0064309 A1 | 3/2017 | Sethuraman | |
| 2020/0142566 A1* | 5/2020 | Kang ................. | H04M 1/72412 |
| 2020/0244926 A1* | 7/2020 | Kinoshita ........... | G06F 3/04847 |

FOREIGN PATENT DOCUMENTS

| | | |
|---|---|---|
| CN | 104346099 A | 2/2015 |
| JP | 2005-535053 | 11/2005 |
| KR | 10-2011-0043612 | 4/2011 |
| KR | 10-2014-0011517 | 1/2014 |
| KR | 10-2014-0052794 | 5/2014 |
| KR | 10-2015-0068509 | 6/2015 |

OTHER PUBLICATIONS

India Office Action dated Mar. 10, 2021 for IN Application No. 201837026594.
European Office Action dated Dec. 18, 2020 for EP Application No. 16879249.7.
European Office Action dated May 7, 2020 for European Application No. 16879249.7.
Chinese Office Action dated Jul. 7, 2020 for Chinese Application No. 201680075875.5.
U.S. Appl. No. 15/368,843, filed Dec. 5, 2016; Ryu et al.
https://www.youtube.com/watch?v=Iqh7_MFJ4x4.
https://www.youtube.com/watch?v=F3AP8CuuUvQ.
https://ios.gadgethacks.com/how-to/email-text-multiple-photos-faster-ios-8-0155336/.
Extended Search Report dated Jul. 23, 2018 in counterpart European Patent Application No. 16879249.7.
Search Report and Written Opinion dated Mar. 27, 2017 in counterpart International Patent Application No. PCT/KR2016/014624.
Tutorial: Metadata Analysis, FotoForensics dated Sep. 7, 2016; 2 pages.
European Intention to Grant dated Jul. 6, 2021 for EP Application No. 16879249.7.

* cited by examiner

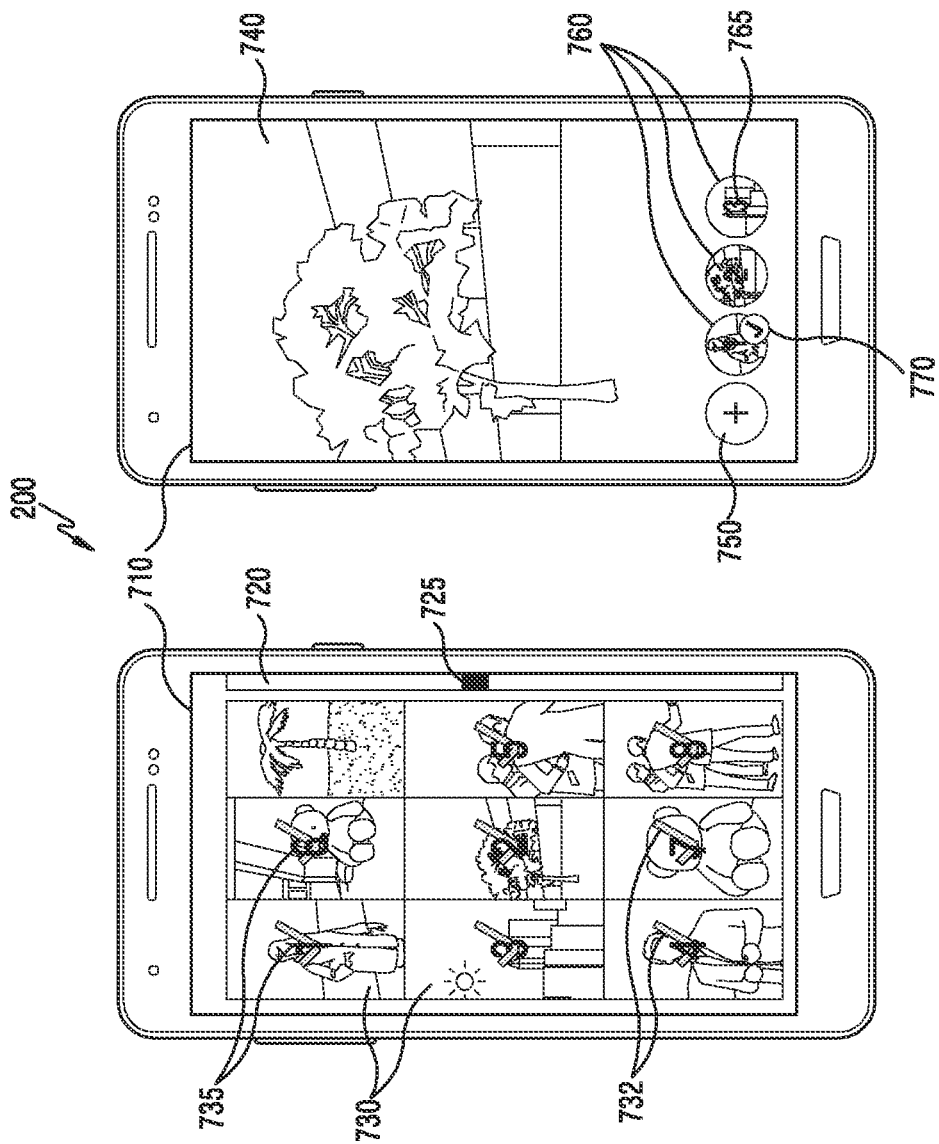

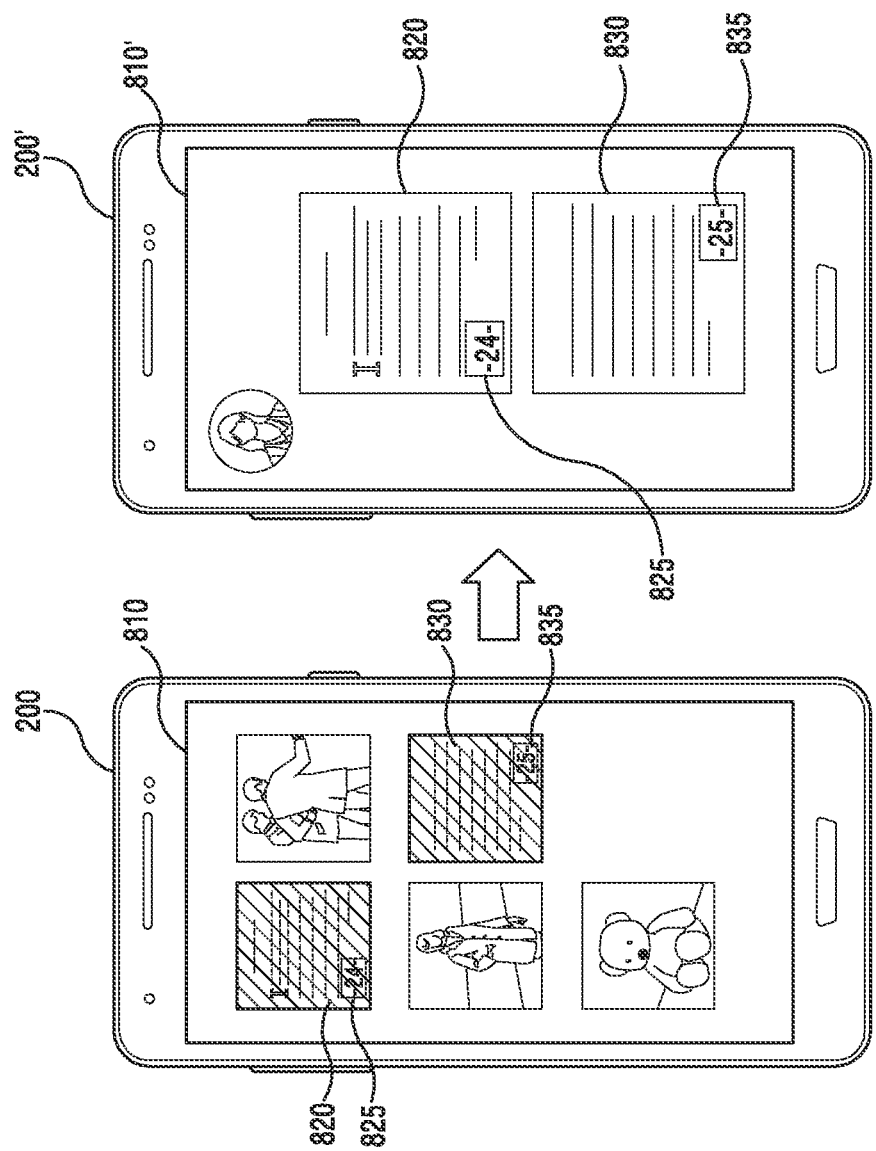

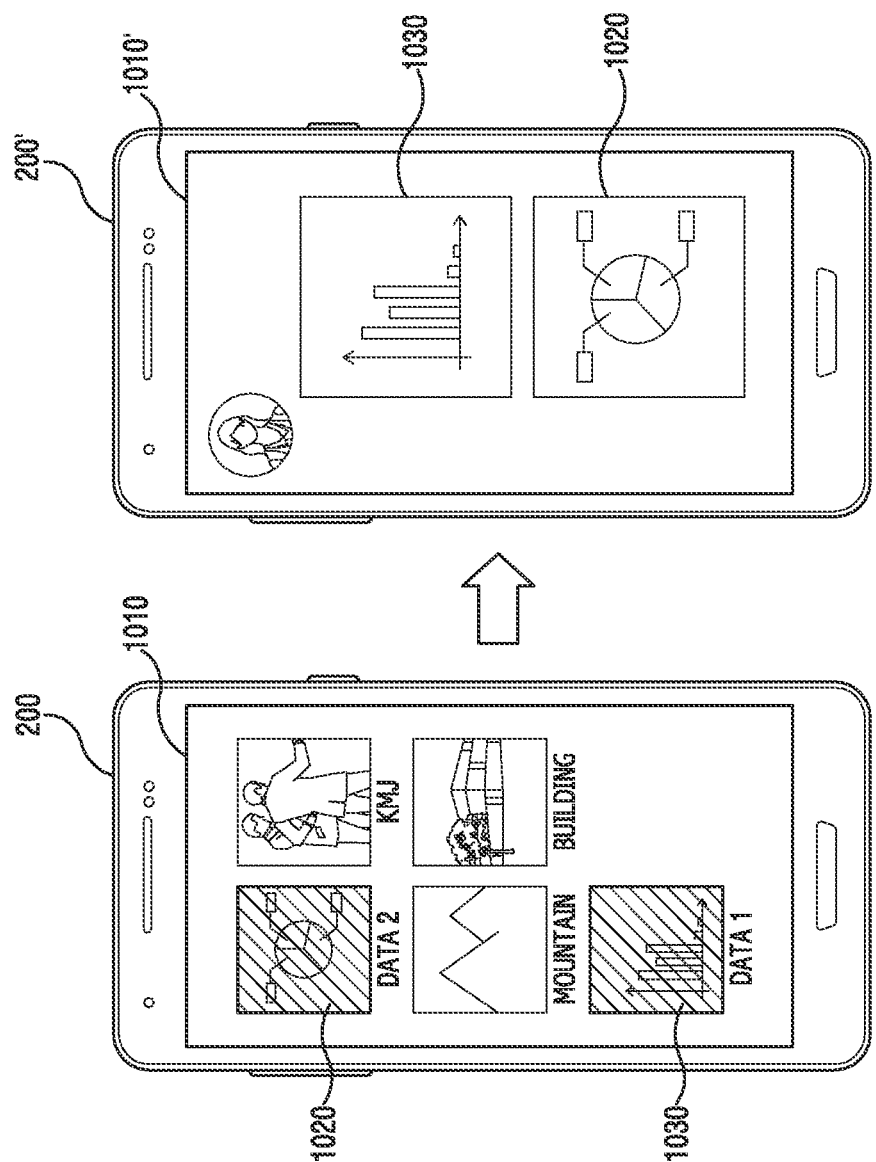

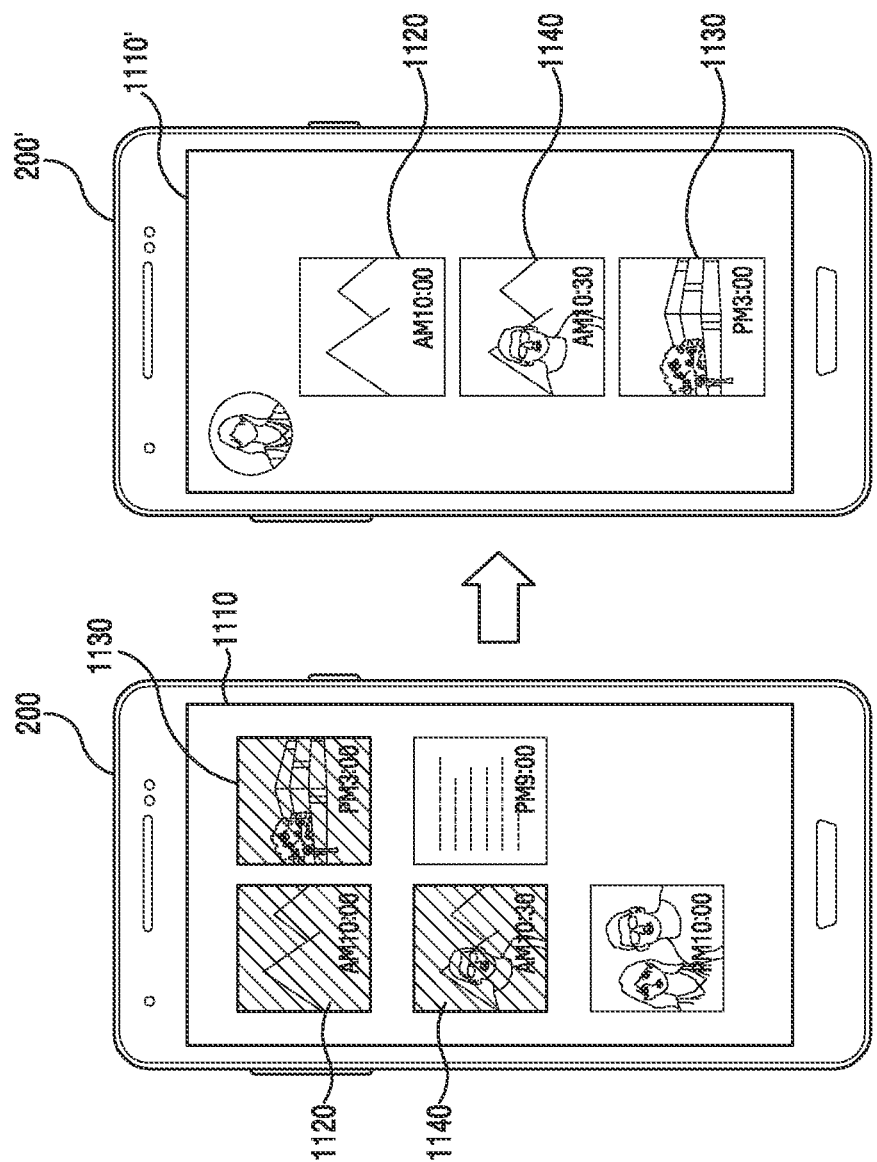

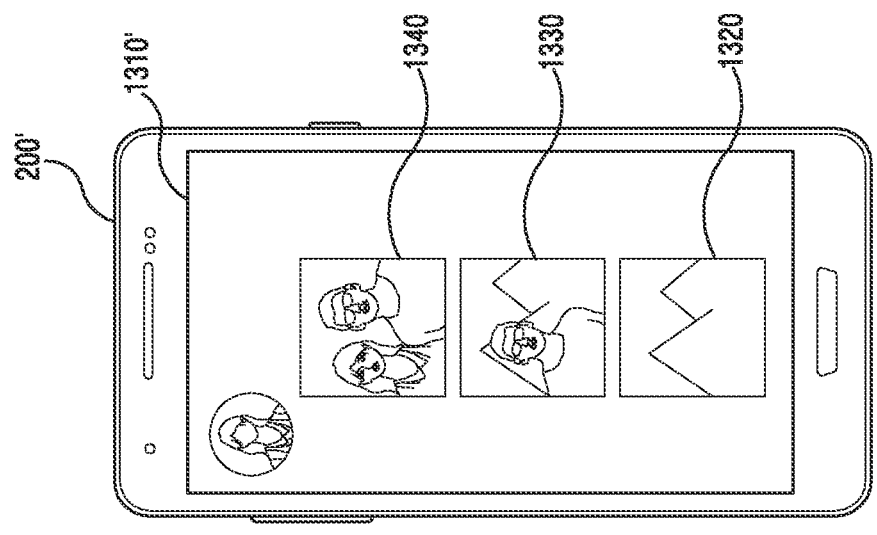
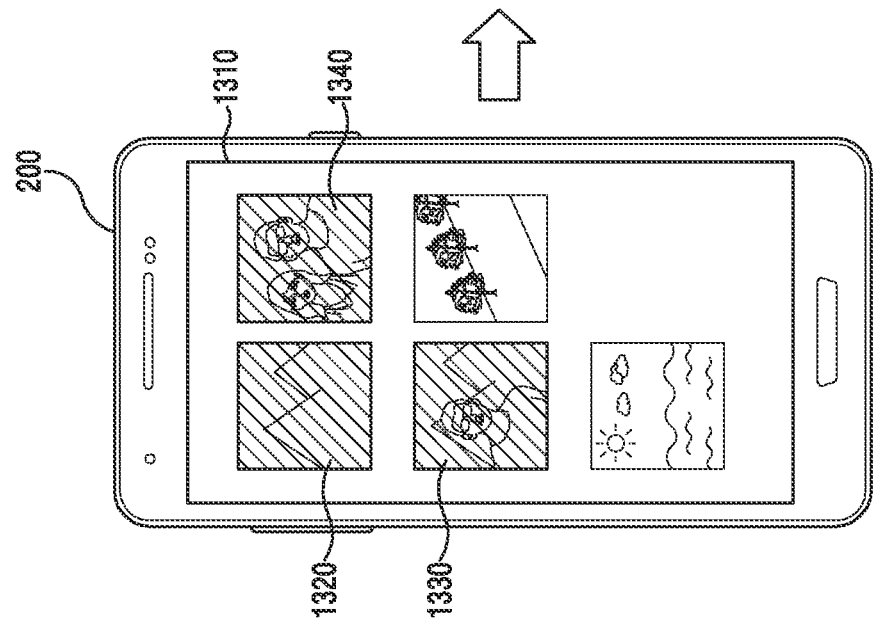
FIG.13A
FIG.13B

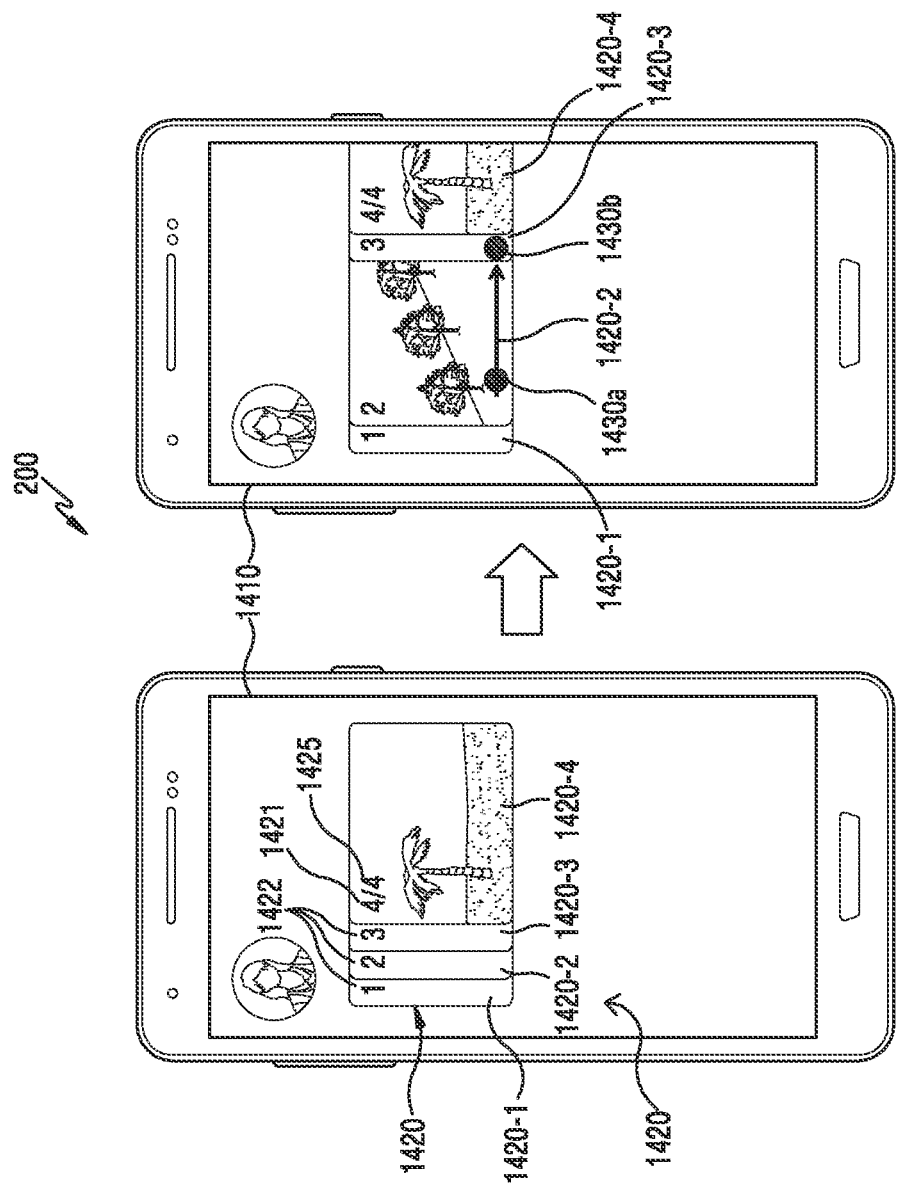

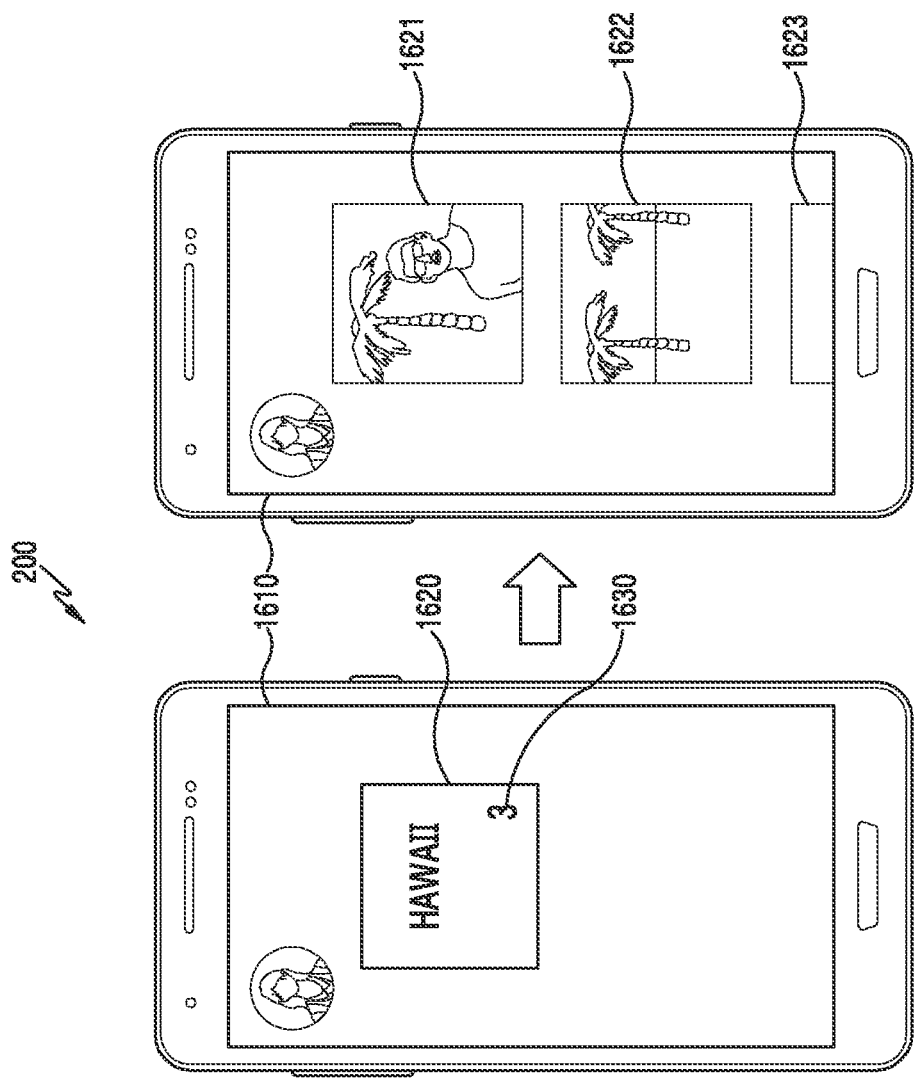

ELECTRONIC DEVICE AND METHOD FOR IMAGE CONTROL THEREOF

CROSS-REFERENCE TO RELATED APPLICATION

This application is a Continuation of U.S. application Ser. No. 16/785,699, filed Feb. 10, 2020 (now U.S. Pat. No. 10,972,414), which is a Continuation of U.S. application Ser. No. 15/368,843, filed Dec. 5, 2016 (now U.S. Pat. No. 10,560,409), which claims priority to KR 10-2015-0186555, filed Dec. 24, 2015, the entire contents of which are all hereby incorporated herein by reference in their entireties.

TECHNICAL FIELD

The present disclosure relates generally to an electronic device and an image control method thereof. For example, the present disclosure relates to an electronic device for displaying a plurality of images in order on a display, and an image control method thereof.

BACKGROUND

Recently, based on technological advances, a messenger service can exchange messages or contents with other electronic device using various electronic devices such as smart phones, tablet computers, or smart watches, without time and space constraints. An existing messenger service is mostly used as a communication means with another party, but now includes various functions. For example, the messenger service is frequently used in a business environment which requires cooperation such as email service, Short Message Service (SMS) service, and call. The messenger service can support message delivery regarding business directive, business report, or group notification to the other party through a chatroom. Further, the messenger service can share contents such as photos, document, or videos with the other party.

Meanwhile, greater importance lies in a function for exchanging a plurality of image files through the messenger service and displaying the received image files in a certain order based on a user's intention or image file properties.

When a first electronic device sends a plurality of image files to a second electronic device, the existing messenger service may not deliver the image files in a sender's intended order because of an image file capacity or a network environment between the two electronic devices and the transmitted image files can be displayed regardless of their properties.

SUMMARY

To address the above-discussed deficiencies of the prior art, it is an example aspect of the present disclosure to provide an apparatus and a method for sending or receiving images based on a user's intention or an image file property (e.g., a property indicating an order, such as page number, time information, location information, etc.).

According to an example aspect of the present disclosure, an electronic device includes a display, a communication interface comprising interface circuitry, and a processor comprising processing circuitry. The processor is configured to receive a plurality of images including a first image and a second image in a first order from an external electronic device using the communication circuitry of the communication interface, to arrange the first image and the second image in a second order at least based on first property information corresponding to the first image and second property information corresponding to the second image, and to arrange and display the first image and the second image in the second order through the display.

According to another example aspect of the present disclosure, a method for operating an electronic device can include receiving a plurality of images including a first image and a second image in a first order from an external electronic device using communication circuitry of a communication interface functionally coupled to the electronic device, arranging the first image and the second image in a second order at least based on first property information corresponding to the first image and second property information corresponding to the second image, and arranging and displaying the first image and the second image in the second order through a display functionally coupled to the electronic device.

According to yet another example aspect of the present disclosure, an electronic device can include a computer-readable recording medium for recording a program which when executed, causes the electronic device to perform operations including arranging and sending a first image and a second image in a first order to an external electronic device at least based on first property information corresponding to the first image and second property information corresponding to the second image, receiving the first image and the second image in the first order, and arranging and displaying the first image and the second image in a second order at least based on the first property information corresponding to the first image and the second property information corresponding to the second image.

According to still another example aspect of the present disclosure, a non-transitory recording medium storing a program which, when executed by an electronic device comprising a display and a communication interface comprising communication circuitry, causes the electronic device to perform a method including receiving a plurality of images including a first image and a second image in a first order from an external electronic device using the communication circuitry of the communication interface, arranging the first image and the second image in a second order at least based on first property information corresponding to the first image and second property information corresponding to the second image, and arranging and displaying the first image and the second image in the second order through the display.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain example embodiments of the present disclosure will be more apparent from the following detailed description, taken in conjunction with the accompanying drawings, in which like reference numerals refer to like elements, and wherein:

FIGS. 7A and 7B are diagrams illustrating an example image display order determined by a user's selection in an electronic device according to an example embodiment of the present disclosure;

FIGS. 8A and 8B are diagrams illustrating an example image display order determined in an electronic device based on an image property according to an example embodiment of the present disclosure;

FIGS. 10A and 10B are diagrams illustrating an example image display order determined in an electronic device based on an image file name according to an example embodiment of the present disclosure;

FIGS. 11A and 11B are diagrams illustrating an example image display order determined in an electronic device based on an image created time according to an example embodiment of the present disclosure;

FIGS. 13A and 13B are diagrams illustrating an example image display order determined in an electronic device based on a scene recognition result of an image according to an example embodiment of the present disclosure;

FIGS. 14A and 14B are diagrams illustrating example received images overlapped with each other and displayed in an electronic device according to an example embodiment of the present disclosure;

FIGS. 16A and 16B are diagrams illustrating example received images displayed in groups in an electronic device according to an example embodiment of the present disclosure;

Throughout the drawings, like reference numerals will be understood to refer to like parts, components and structures.

DETAILED DESCRIPTION

Figure 1:
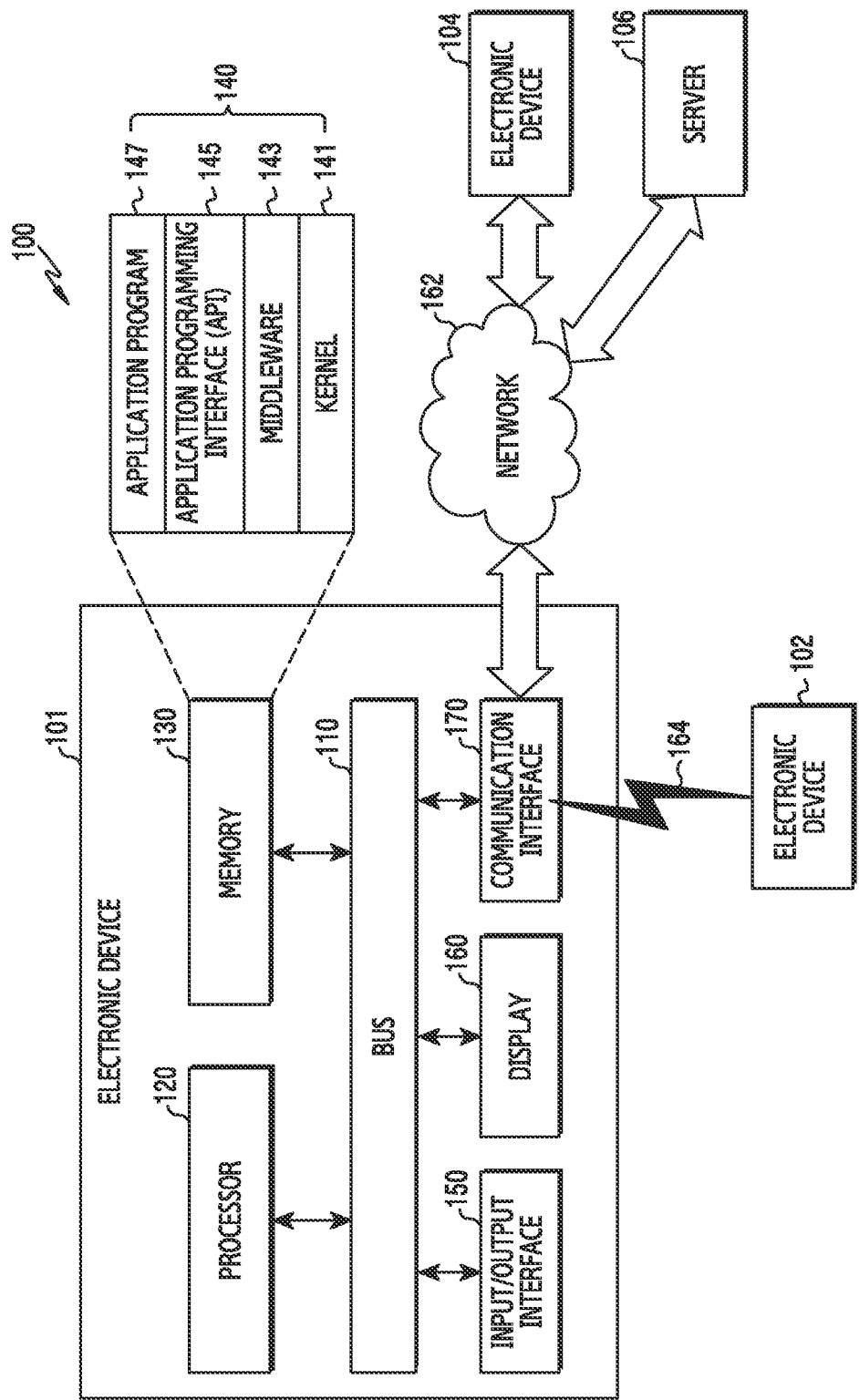
FIG. 1 is a diagram illustrating an example electronic device in a network environment according to an example embodiment of the present disclosure.

Hereinafter, various example embodiments of the present disclosure are disclosed with reference to the accompanying drawings. However, it should be understood that it is not intended to limit the present disclosure to a particular form but, on the contrary, the intention is to cover various modifications, equivalents, and/or alternatives of the example embodiments of the present disclosure. In relation to descriptions of the drawings, like reference numerals can be used for similar components.

In the disclosure, an expression such as "have", "can have", "include" or "can include" refers to presence of a corresponding characteristic (e.g., a number, a function, an operation, or a component such as a part), and does not exclude presence of an additional characteristic.

In the disclosure, an expression such as "A or B", "at least one of A or/and B", or "one or more of A or/and B" can include any and every combination of items listed together. For example, "A or B", "at least one of A and B", or "at least one of A or B" can indicate the entire of (1) a case of including at least one A, (2) a case of including at least one B, or (3) a case of including both at least one A and at least one B.

Expressions such as "first," "second," "primary," or "secondary" used in various example embodiments can represent various elements regardless of order and/or importance and do not limit corresponding elements. Such expressions are used for distinguishing one element from another element. For example, a first user device and a second user device can represent different user devices regardless of order or importance. For example, a first element can be referred to as a second element without deviating from the scope of the present disclosure, and similarly, a second element may be referred to as a first element.

When an element (e.g., a first element) is "operatively or communicatively coupled with/to" or "connected to" another element (e.g., a second element), it should be understood that the element can be directly connected to another element or can be connected to another element through other element (e.g., a third element). By contrast, when an element (e.g., a first element) is "directly connected" or "directly coupled" to another element (e.g., a second element), it should be understood that there is no other element (e.g., a third element) between the element and another element.

An expression "configured to (or set)" used in the present disclosure can be replaced with, for example, "suitable for," "having the capacity to," "designed to," "adapted to," "made to," or "capable of" according to a situation. A term "configured to (or set)" may not always refer, for example, to "specifically designed to" by hardware. Instead, in some situation, an expression "apparatus configured to" can mean that the apparatus "can" operate together with another apparatus or other components. For example, "a processor configured (or set) to perform A, B, and C" can be a dedicated processor (e.g., an embedded processor, processing circuitry, etc.) for performing a corresponding operation or a generic-purpose processor (e.g., a Central Processing Unit (CPU) or an Application Processor (AP)) which can perform a corresponding operation by executing one or more software programs stored in a memory device.

Terms used in the present disclosure are used for describing various example embodiments and are not intended to limit the scope of other embodiments. A singular form can include a plurality of forms unless it is explicitly differently represented. All the terms used herein, including technical and scientific terms, can have the same meanings as terms that are generally understood by those skilled in the art. The terms defined in a general dictionary can be interpreted to have the same or similar meanings with the context of the relevant art, and, unless explicitly defined in this disclosure, it shall not be interpreted ideally or excessively as formal meanings. In some cases, even when terms are defined in this disclosure the terms should not be interpreted to exclude the embodiments of the present disclosure.

An electronic device according to various example embodiments of the present disclosure can include, for example, at least one of a smart phone, a tablet Personal Computer (PC), a mobile phone, a video phone, an e-book reader, a desktop PC, a laptop PC, a netbook computer, a workstation, a sever, a Personal Digital Assistant (PDA), a Portable Multimedia Player (PMP), an MPEG 3 (MP3) player, a mobile medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit, or the like, but is not limited thereto.

In some example embodiments, the electronic device can be a smart home appliance. The smart home appliance can include at least one of, for example, a television, a Digital Video Disk (DVD) player, an audio device, a refrigerator, an air-conditioner, a cleaner, an oven, a microwave oven, a washing machine, an air cleaner, a set-top box, a home automation control panel, a security control panel, a TV box (e.g., Samsung HomeSync™ Apple TV™, or Google TV™), a game console (e.g., Xbox™, PlayStation™), an electronic dictionary, an electronic key, a camcorder, and an electronic frame, or the like, but is not limited thereto.

In another example embodiment, the electronic device can include at least one of various medical devices (e.g., various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (e.g., a navigation device for ship and gyro compass), avionics, a security device, a head unit for a vehicle, an industrial or home robot, an Automated Teller Machine (ATM) of a financial institution, a Point Of Sales (POS) device of a store, and an Internet of Things (IoT) device (e.g., a light bulb, various sensors, electricity or gas meter, a sprinkler device, a fire alarm, a thermostat, a street light, a toaster, sports equipment, a hot water tank, a heater, and a boiler), or the like, but is not limited thereto.

According to an example embodiment, the electronic device can include at least one of a portion of furniture or building/construction, an electronic board, an electronic signature receiving device, a projector, and various measuring devices (e.g., water supply, electricity, gas, or electric wave measuring device), or the like, but is not limited thereto. According to various example embodiments, the electronic device can be a combination of two or more of the foregoing various devices.

An electronic device according to an example embodiment can be a flexible electronic device. An electronic device according to example embodiments of the present disclosure is not limited to the foregoing devices and can include a newly developed electronic device.

Hereinafter, an electronic device according to various example embodiments will be described with reference to the accompanying drawings. The term "user", as used herein, can refer to a person using an electronic device or a device using an electronic device (e.g., an artificial intelligence electronic device).

FIG. 1 is a diagram illustrating an example electronic device in a network environment according to various example embodiments of the present disclosure.

Referring to FIG. 1, an electronic device 101 resides in a network 100 according to various example embodiments. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. In an example embodiment, the electronic device 101 can omit at least one of the components or further include an additional component.

The bus 110 can include a circuit for connecting the components 120 through 170 and delivering communication signals (e.g., control messages or data) between the components 120 through 170.

The processor 120 can include various processing circuitry, such as, for example, and without limitation, one or more of a CPU, an AP, and a Communication Processor (CP). The processor 120, for example, can perform an operation or data processing regarding control and/or communication of at least other component of the electronic device 101. The processing (or controlling) operation of the processor 120 according to various embodiments shall be elucidated by referring to the drawings.

The memory 130 can include a volatile and/or nonvolatile memory. The memory 130, for example, can store commands or data relating to at least other component of the electronic device 101. According to an example embodiment, the memory 130 can store software and/or a program 140. The program 140 can include a kernel 141, middleware 143, an Application Programming Interface (API) 145, and/or an application program (or "application") 147. At least part of the kernel 141, the middleware 143, or the API 145 can be referred to as an Operating System (OS).

The memory 130 can store one or more programs executed by the processor 120, and may temporarily store input/output data. According to various example embodiments, the memory 130 can store data obtained, data acquired in real time can be stored in a temporary storage device, and data to store can be stored in a storage device which allows long-time storage. The memory 130 can include a computer-readable recording medium which records a program for making the processor 120 fulfill methods according to various example embodiments.

The recording medium according to various example embodiments can include a computer-readable recording medium which records a program for arranging and sending a first image and a second image in a first order to an external electronic device at least based on first property information corresponding to the first image and second property information corresponding to the second image, receiving the first image and the second image in the first order, and arranging and displaying the first image and the second image in a second order at least based on the first property information corresponding to the first image and the second property information corresponding to the second image.

The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing the system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication.

Also, the middleware 143 can process one or more job requests received from the application program 147, based on their priority. For example, the middleware 143 can assign a priority for using the system resource (e.g., the bus 110, the processor 120, or the memory 130) of the electronic device 101 to at least one of the application programs 147. For example, the middleware 143 can perform scheduling or load balancing of the one or more job requests by processing the one or more job requests based on the priority given to the at least one.

The API 145, as an interface through which the application 147 controls a function provided from the kernel 141 or the middleware 143, can include, for example, at least one interface or function (e.g., an instruction) for file control, window control, image processing, or character control.

The input/output interface 150, for example, may include various input/output circuitry that can serve as an interface for delivering commands or data inputted from a user or another external device to other component(s) of the electronic device 101. Also, the input/output interface 150 can output commands or data input from the other component(s) of the electronic device 101 to the user or another external device. For example, the input/output interface 150 can include a wired/wireless headphone port, an external charger port, a wired/wireless data port, a memory card port, an audio input/output port, a video input/output port, an earphone port, and so on.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display 160, for example, can display various contents (e.g., texts, images, videos, icons, or symbols) to the user. The display 160 can include a touch screen, for example, and receive touch, gesture, proximity, or hovering inputs by using an electronic pen or a user's body part.

The display 160 can display, for example, a visual output to the user. The visual output can include text, graphic, video, and their combination. The display 160 can display (output) various information processed in the electronic device. For example, the display 160 can display a User Interface (UI) or a Graphical UI (GUI) for using the electronic device.

According to various example embodiments, the display 160 can display various UIs (e.g., UIs or GUIs) regarding the operation executed by the electronic device 101. Various screens provided based on the UI in the electronic device 101 according to various embodiments shall be explained by referring to the drawings.

In various example embodiments, the display 160 can include a curved display (or a bended display) which can be curved, bended, or rolled without any damage through a flat display or a thin and flexible substrate like paper. The curve display can be coupled with a housing (or bezel, main body) to maintain its bended shape. In addition to the curve display, the electronic device 101 may be implemented using a display device which can be freely bended and spread like a flexible display. The display 160 may, for example, attain flexibility for the bending and the spreading by replacing a glass substrate surrounding liquid crystals in an LCD, an LED, an OLED, or an AMOLED with a plastic film. The display 160 can be extended to at least one side (e.g., at least one of a left side, a right side, an upper side, a lower side) of the electronic device 101, bended below a radius of curvature (e.g., the radius of curvature 5 cm, 1 cm, 7.5 mm, 5 mm, 4 mm, etc.) for operating the curve display, and then coupled to a side of a housing.

The communication interface 170, for example, may include various communication circuitry that can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 using wireless communication or wired communication.

The wireless communication, for example, can at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. The wireless communication can include, for example, short-range communication 164. The short-range communication 164 can include, for example, at least one of Wireless Fidelity (WiFi), Bluetooth, Near Field Communication (NFC), and GNSS. The GNSS can include, for example, Global Positioning System (GPS), Global Navigation Satellite System (GLONASS), Beidou navigation satellite system (Beidou), or Galileo (the European global satellite-based navigation system), according to its use area or bandwidth. Hereafter, the GPS can be interchangeably used with the GNSS. The wired communication, for example, can include at least one of Universal Serial Bus (USB), High Definition Multimedia Interface (HDMI), Recommended Standard 232 (RS-232), and Plain Old Telephone Service (POTS). The network 162 can include a telecommunications network, for example, at least one of a computer network (e.g., Local Area Network (LAN) or Wide Area Network (WAN)), Internet, and a telephone network.

Each of the first and second external electronic devices 102 and 104 can be of the same as or of a different type from the type of the electronic device 101. According to an example embodiment, the server 106 can include a group of one or more servers. According to various example embodiments, all or part of the operations executed in the electronic device 101 can be executed by one or more other electronic devices (e.g., the electronic devices 102 and 104, or the server 106). When the electronic device 101 is to perform a function or service automatically or by request, instead of or in addition to performing the function or the service by the electronic device 101, the electronic device 101 can request at least part of the related function from other device (e.g., the electronic device 102 or 104, or the server 106). The other electronic device (e.g., the electronic device 102 or 104, or the server 106) can perform the requested function or an additional function and provide its result to the electronic device 101. The electronic device 101 can provide the requested function or service by processing the received result as it is or additionally. In doing so, for example, cloud computing, distributed computing, or client-server computing techniques can be used.

The server 106 can include at least one of, for example, a messenger server, a message server, an application server, a management server, an integration server, a provider server (or a telecommunication operator server), a content server, an Internet server, and a cloud server. The server 106 can include one or more servers for sending images based on a preset order of the electronic device 101.

Figure 2:
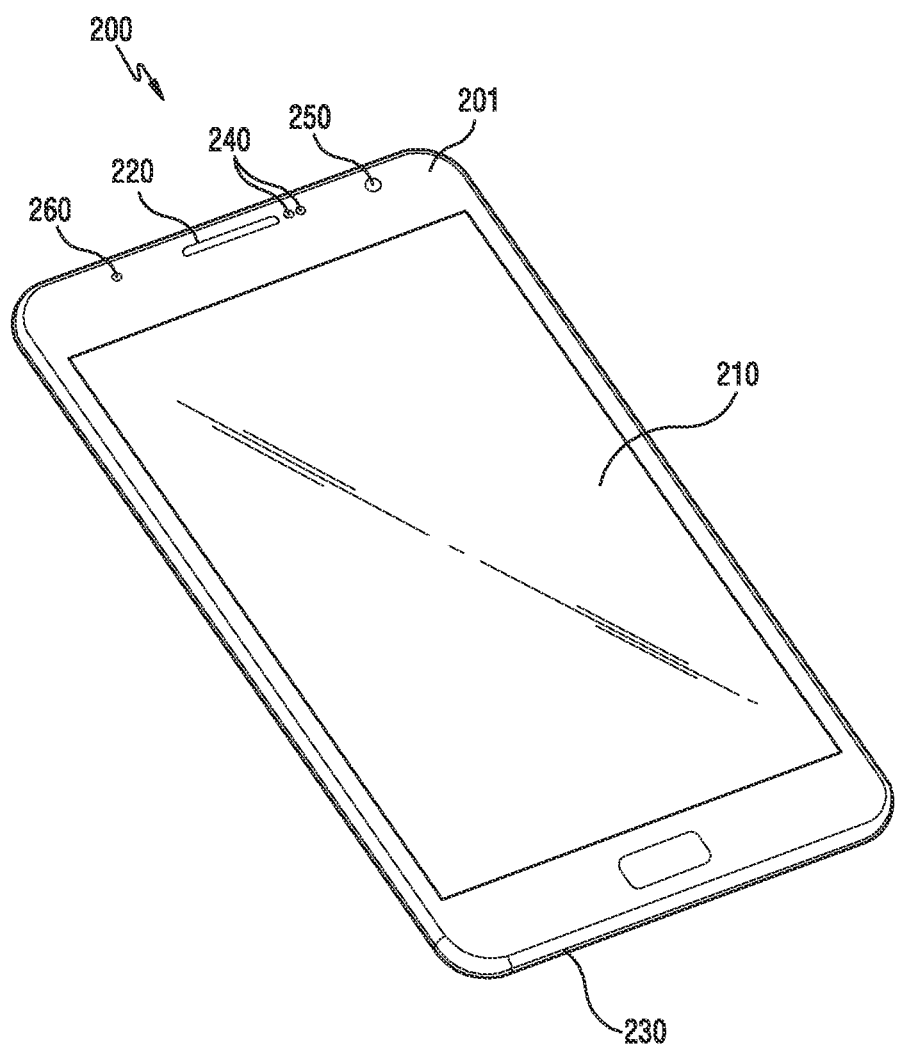
FIG. 2 is a diagram illustrating an example electronic device according to an example embodiment of the present disclosure.

FIG. 2 is a diagram illustrating an example electronic device according to an example embodiment of the present disclosure. The electronic device 101 of FIG. 1 can include an electronic device 200 of FIG. 2.

Referring to FIG. 2, the electronic device 200 can be implemented using devices for various purposes. For example, the electronic device 200 can be implemented using, but not limited to, a mobile phone, a smart phone, a laptop computer, a tablet device, an electronic book device, a digital broadcasting device, a PDA, a PMP, a navigation device, or a wearable device such as a smart watch, smart glasses, or a HMD.

Referring to FIG. 2, a front side 201 of the electronic device 200 can include a display 210. A speaker 220 for receiving a voice of other party can be disposed above the display 210. A microphone 230 for sending a user voice of the electronic device 200 to the other party can be disposed below the display 210.

According to an example embodiment, components for performing various functions of the electronic device 200 can be disposed around the speaker 220. The components can include, for example, at least one sensor module 240. The sensor module 240 can include at least one of, for example, a light sensor (e.g., an optical sensor), a proximity sensor, an infrared sensor, and an ultrasonic sensor. The components can include a camera 250. The components can include an LED indicator 260 for notifying status information of the electronic device 200 to the user.

The electronic device 200 can capture an object using the camera 250. The electronic device 200 can send the captured image or video to various external electronic devices over the network 162 of FIG. 1, for example. The electronic device 200 can access the network 162 using a messenger program and send and receive data to and from the external electronic devices. The electronic device 200 sends and receives contents such as images or videos using the messenger program, which will be explained in greater detail below.

Figure 3:
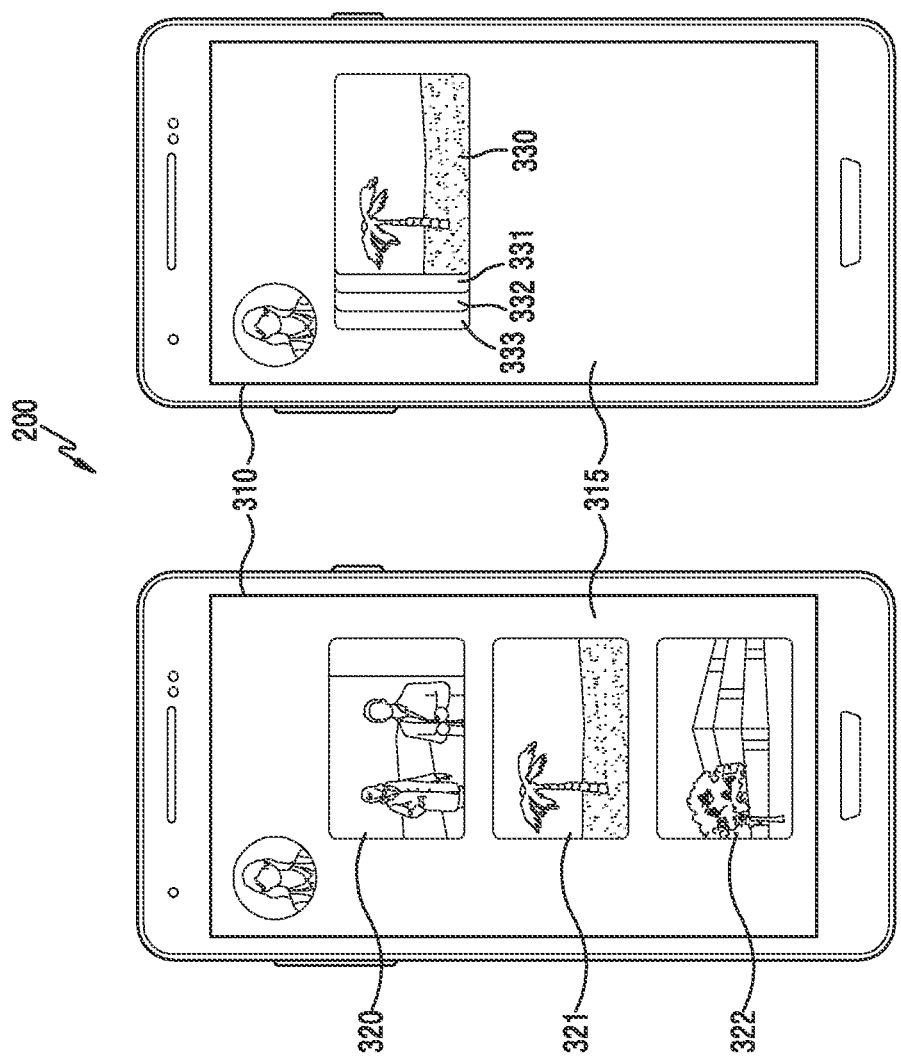
FIGS. 3A and 3B are diagrams illustrating example images received and displayed in an electronic device according to an example embodiment of the present disclosure.

FIGS. 3A and 3B are diagrams depicting example received images displayed in an electronic device according to an example embodiment of the present disclosure.

The electronic device 200 can send and receive data using various messenger programs. The various messenger programs may be installed in advance on the electronic device 200, or the user may download the various messenger programs from a separate external server and install them on the electronic device 200. Data exchanged between the electronic device 200 and other electronic devices (e.g., the first external electronic device 102, the second external electronic device 104) using the messenger program can include various contents such as, for example, images, videos, and text. When sending an image or a video to the other electronic device, the electronic device 200 may send an original image or video, or a copy of the image or the video. The electronic device 200 may send an image or a video to the other electronic device by adjusting a size of the image or video copy.

In FIG. 3A, images received at the electronic device 200 are displayed in order of the images. The electronic device 200 can display a chat window 315 of a running messenger program on a display 310.

The chat window 315 can, for example, list received images 320, 321, and 322 vertically. According to an example embodiment, the electronic device 200 can display the received images 320, 321, and 322 in order as received from the other electronic device. For example, when displaying the received images 320, 321, and 322, the electronic device 200 can receive display order information designated by a sender, or receive or analyze property information (e.g., indicating the order, such as page number, time information (e.g., a captured time, a created time), location (place) information, file name, object movement (e.g., scene) information in image) of an image file. The electronic device 200 can display the images 320, 321, and 322 in the corresponding display order received or analyzed.

The electronic device 200 can display images listed in succession vertically in the chat window 315. The number of images displayed on a screen can differ based on a size of the display 310 of the electronic device 200. For example, the display 310 can display two or three received images. Provided that three images 320, 321, and 322 are displayed on the display 310 as illustrated in FIG. 3A, when more images are received, the three images 320, 321, and 322 can be moved upward in response to the number of the more images received and then framed out (or slid out) (e.g., an effect for disappearing from the screen) of the screen. For example, when a plurality of images is received and displayed, the images received early can be scrolled upward in the received order based on the other images received and then disappear from the display 310.

The user can view the disappeared images on the display 310 using, for example, touch and drag. The user can see the disappeared images on the current display 310 using, for example, touch and drag.

In FIG. 3B, the electronic device 200 displays received images in their order.

Referring to FIG. 3B, the electronic device 200 can display the chat window 315 of the running messenger program on the display 310.

The chat window 315 can display received images 330 through 333 to overlap with each other in a particular direction (e.g., in a horizontal direction). While the images 330 through 333 are overlapped and displayed in, but not limited to, the horizontal direction in FIG. 3B, they can be overlapped and displayed vertically. According to an example embodiment, the electronic device 200 can display the images 330, 331, 332 as received from the other electronic device (e.g., the first external electronic device 102, the second external electronic device 104).

According to an example embodiment of the present disclosure, when displaying the received images 330 through 333, the electronic device 200 can receive display order information designated by a sender, or receive or analyze property information (e.g., indicating the order, such as page number, time information (e.g., a captured time, a created time) location (place) information, file name, object movement (e.g., scene) information in image, etc.) of an image file. The electronic device 200 can display the images 330 through 333 in the corresponding order received or analyzed. The electronic device 200 can overlap and display the received images 330 through 333 horizontally such that the user can view the previously received image on the current display 310.

According to an example method for displaying the received images according to an example embodiment of the present disclosure, the user can see the received images without an additional operation. The electronic device 200 can arrange or bind images based on a particular criterion and display them on the display 310. Hence, when a plurality of images is received, the receiver can see the images without an additional operation such as rearrangement.

Figure 4:
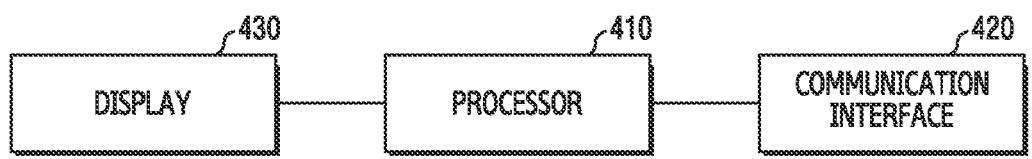
FIG. 4 is a block diagram illustrating an example electronic device according to an example embodiment of the present disclosure.

FIG. 4 is a block diagram illustrating an example electronic device according to an example embodiment of the present disclosure.

Referring to FIG. 4, the electronic device 200 can include a processor (e.g., including processing circuitry) 410, a communication interface (e.g., including communication circuitry) 420, and a display 430. The electronic device 200 according to various example embodiments does not necessarily include the components of FIG. 4, and can include more or less components than those in FIG. 4. For example, the electronic device 200 can include an input module (e.g., various input circuitry, such as, for example, and without limitation, a touch panel, a physical key, a proximity sensor, a bio sensor, etc.), a camera, a memory, a power supply unit, and so on.

The communication interface 420 can include the communication interface 170 of FIG. 1. The communication interface 420 can include various communication circuitry configured to allow the electronic device 200 and an external electronic device to exchange data using the messenger program.

The display 430 can be included in an output module of FIG. 200. The output module can include various output circuitry such as, for example, and without limitation, a display, a speaker, a vibration generating module, and an LED indicator. When receiving data from the external electronic device through the communication interface 420, the output module can notify the user using such components. The display 430 can display received text messages, images, videos, and the like. When receiving data from the external electronic device, the speaker, the vibration generating module, and the LED indicator can notify the user by producing sound, vibration, and LED light.

The processor 410 can include various processing circuitry configured to control the operations of the above-mentioned components. For example, the processor 410 can store video contents created through the camera module and contents created through the input module in a memory. The processor 410 can establish communication with the external electronic device using the communication interface 420, and send the created contents to the external electronic device using the messenger program. When receiving data from the external electronic device, the processor 410 can control the display 430 to display the received data, or produce the vibration or the sound based on the other output module (e.g., the vibration generating module, the speaker).

Descriptions of various example embodiments are used to explain various examples where the messenger program for exchanging various contents between electronic devices is driven using the components of the electronic device 200 are provided below.

Figure 5:
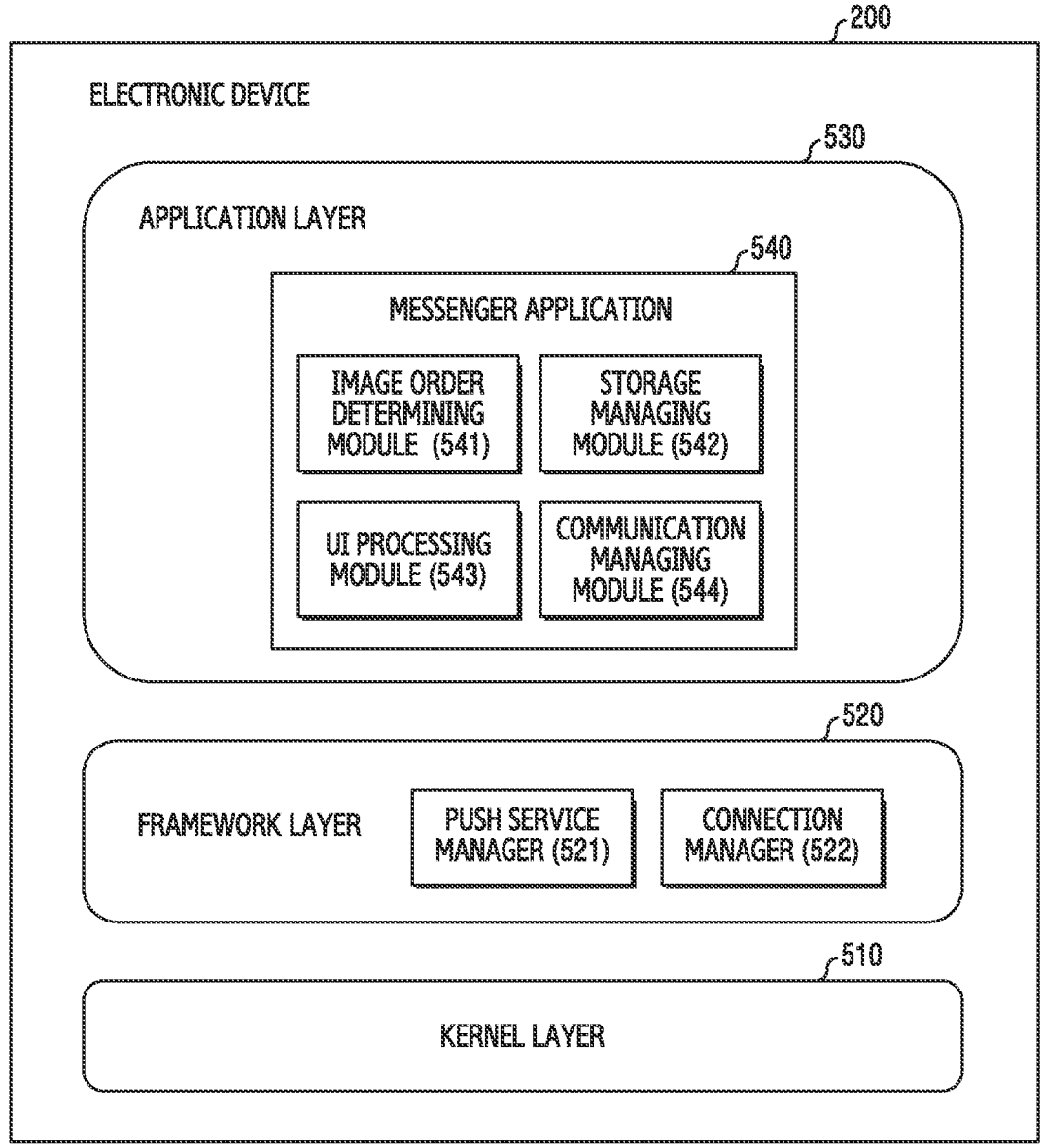
FIG. 5 is a block diagram illustrating example software for running a messenger program in an electronic device according to an example embodiment of the present disclosure.

FIG. 5 is a block diagram illustrating example software for running a messenger program in an electronic device according to an example embodiment of the present disclosure.

Referring to FIG. 5, the electronic device 200 can include a software block of various layers. The software block of the electronic device 200 can include, for example, a kernel layer 510, a framework layer 520, and an application layer 530.

The kernel layer 510 can include, for example, various drivers for driving various devices. The drivers for driving various devices can include, for example, a display driver, a camera driver, and a Bluetooth driver.

The framework layer 520 can run on the kernel layer 510. The framework layer 520 can provide a common function required by applications, or various functions so that the applications can efficiently use resources in the electronic device 200. The framework layer 520 can include, for example, a push service manager 521 and a connection manager 522.

The push service manager 521 may refer, for example, to a push receiving manager of the electronic device 200. In message transmission to the electronic device 200, when the electronic device 200 is not connected to a Proxy Server (PS), an external messenger server can send a push notification through a push system. The push service manager 521 of the electronic device 200 can forward the push notification from the external messenger server to the other components of the electronic device 200.

The connection manager 522 can manage Transmission Control Protocol (TCP) connection with the PS. The connection manager 522 performs a keep-alive operation to detect a channel before activation, and encode the channel. In this case, the channel encoding can indicate high-level encoding above the TCP, such as Secure Sockets Layer (SSL)/Transport Layer Security (TLS).

The application layer 530 can include various applications. For example, the application layer 530 can include a messenger application 540 as illustrated in FIG. 5.

The messenger application 540 can operate in the application layer 530. The messenger application 540 can include an image order determining module 541, a storage managing module 542, a UI processing module 543, and a communication managing module 544. Such modules are defined based on their function by way of example, and may be implemented in other forms.

The image order determining module 541 processes display order information of images. When a plurality of images is transmitted to the external electronic device, the image order determining module 541 can determine the display order based on property information of the images and send the determined information together with the images. For example, the image order determining module 541 can determine the display order of a first image and a second image based on first property information corresponding to the first image and second property information corresponding to the second image. The image order determining module 541 can determine the display order of the received images and display them in a corresponding order.

The property information for determining the display order of the images can vary. For example, the property information can be a display order value of images determined by a sender who sends the images using the messenger program. The property information may include information derived from metadata of the image or analysis information of the image. The property information can include data about the display order of the images, and property data including the data value derived from the image metadata. The property information for determining the display order of the images shall be explained in greater detail below.

When sending an image to an external server using a general messenger program, the electronic device 200 can convert the image to transmit to a binary type and include it in an API of the external server agreed with the electronic device 200. In this case, the API header can include information of a server address (e.g., Uniform Resource Locator (URL)), a type of the transmit data, and a size of the transmit data.

The electronic device 200 can include the image display order information determined by the image order determining module 541 based on the image property information, in the API header. The electronic device 200 can invoke the API every time it sends an image to the external server. According to an example embodiment, when sending ten images to the external server, the electronic device 200 can invoke the corresponding API ten times. Accordingly, in every image transmission, the electronic device 200 can include information about how many images are transmitted in total and which image is currently transmitted, in the API header.

As such, the image order determining module 541 can determine the order of the images and send the corresponding information together with the images. When receiving a plurality of images, the image order determining module 541 may display the received images by determining their display order.

The storage managing module 542 can store and manage chatroom information of the user. For example, the chatroom information can include chatroom identification information, chatroom member identification information, messages in the chatroom, and message read information indicating whether or not the user reads a message. The message read information can include message reading/not-reading information (e.g., message read or message not read) and message read time. The message read information can include the time when the message is shown on the screen and an expected time taken to read the message. The storage managing module 542 can store and manage contents such as images, videos, and files transmitted.

The UI processing module 543 can process the UI regarding the message. For example, when the user is determined to read the message displayed in the chatroom, the UI processing module 543 can highlight (e.g., change a color, flicker, change thickness) a speech bubble including the user's read message, a perimeter of the speech bubble, and/or edges of the speech bubble. The UI processing module 543 can display a popup screen asking about whether a threshold time for determining that the user reads the message is appropriate. When the user wants to adjust the threshold time, he/she can enter a threshold setting screen through the UI in the popup screen.

According to an example embodiment, for user's convenience, the popup screen UI may be displayed only for a certain time period after the messenger application is installed and not displayed further after the certain time period. The UI processing module 543 may display the time when the user reads a message.

Based on message read information received from the communication module 420, the UI processing module 543 can highlight a speech bubble including a message read by the other party, a perimeter of the speech bubble, and/or edges of the speech bubble in the chatroom, or display the number of other parties who read the message. Based on the message read information, the UI processing module 543 may display the time when the other party reads the message.

The UI processing for the message in the UI processing module 543 can distinguish the message read by the user and the message not read by the user and thus reduce messages missed by the user. Also, as the message read by the other party and the message not read by the other party are distinguished, a user's need for knowing whether the other party receives the message can be satisfied.

The communication managing module 544 allows the electronic device 200 to exchange data with an external messenger server. For example, the communication managing module 544 can exchange information about whether the other party reads the transmitted message, with the external messenger server. The communication managing module 544 can perform such a function through the communication interface 420.

According to various example embodiments, the electronic device 200 includes, but not limited to, all of the components. For example, at least some of the components of the electronic device 200 can be distributed to the electronic device 200 and the external electronic device (e.g., the first external electronic device 102, the second external electronic device 104, or the server 106) according to the role, the function, or the performance of the electronic device 200. For example, the kernel layer 510 and the framework layer 520 can be implemented in the electronic device 200, and the application layer 530 can be implemented in the external electronic device.

According to various example embodiments, at least part of the image order determining module 541, the storage managing module 542, the UI processing module 543, and the communication managing module 544 can be implemented with software, firmware, hardware (e.g., circuitry), or a combination of at least two of them. At least part of the image order determining module 541, the storage managing module 542, the UI processing module 543, and the communication managing module 544 can be implemented (e.g., executed) by, for example, a processor (e.g., the processor 120 and 140 including processing circuitry). At least part of the image order determining module 541, the storage managing module 542, the UI processing module 543, and the communication managing module 544 can include, for example, a module, a program, a routine, sets of instructions, or a process, for executing one or more functions.

Figure 6:
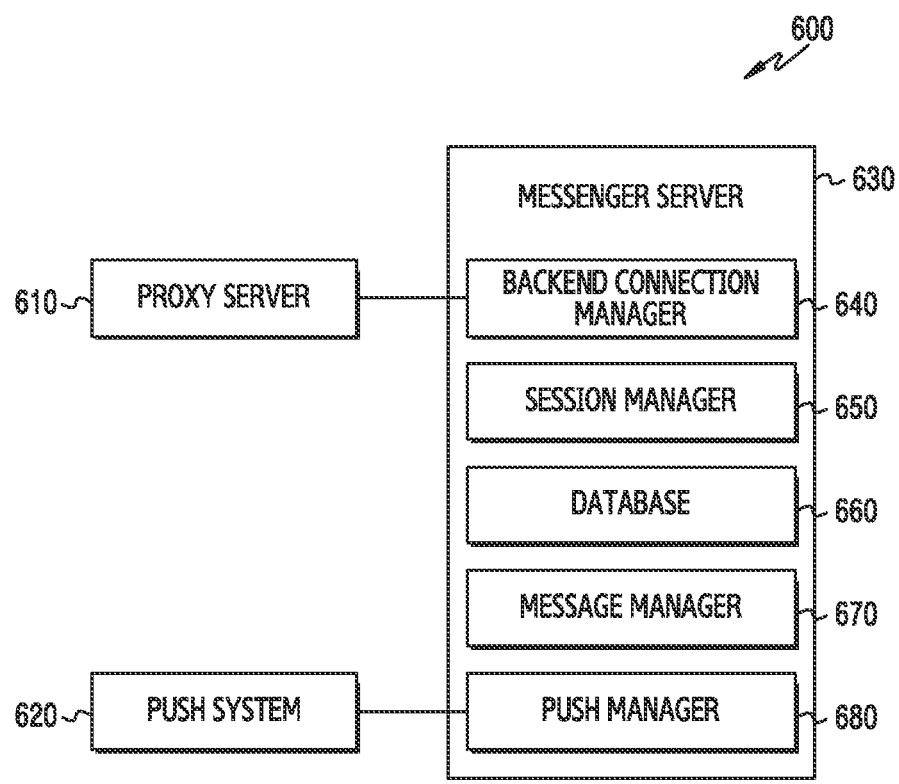
FIG. 6 is a block diagram illustrating example components of a server according to an example embodiment of the present disclosure.

FIG. 6 is a block diagram illustrating example components of a server according to various example embodiments of the present disclosure.

In FIG. 6, the server 600 can include at least one of a proxy server 610, a push system 620, and a messenger server 630. According to an example embodiment, the proxy server 610 and the push system 620 may be part of the messenger server 630, or may be implemented as independent servers. The electronic device 200 can be connected to the messenger server 630 over a network. The network may include a wired and/or wireless network interconnecting the server 600 and the electronic device 200. Various examples of the wired or wireless network have been described in FIG. 1 and thus repeated descriptions thereof are omitted here.

The proxy server 610 can manage TCP connection with the electronic device 200. For example, the proxy server 610 can periodically exchange keep-alive messages with the electronic device 200 for the TCP connection management, or can relay data transmission and reception between the electronic device 200 and the messenger server 630. Also, the proxy server 610 can send connection establishment/ connection release event between the electronic device 200 and the TCP, to other servers (e.g., the messenger server 630) connected to the proxy server 610.

According to an example embodiment, the electronic device 200 and the messenger server 630 can be connected directly over the network, without the proxy server 610. The proxy server 610 may be included as one component in the messenger server 630. The proxy server 610 may include a plurality of servers.

The push system 620 (or a pushy server) provides, for example, a push service such as Google Cloud Messaging (GCM), Samsung Push Platform (SPP), or Apple Push Notification Service (APNS). The push system 620 may use those services or include a plurality of servers.

The messenger server 630 processes a chatroom and messages. The messenger server 630 can create and manage a chatroom and transmit/receive messages in association with various infrasystems installed inside/outside (e.g., Relational DataBase (RDB), Not only Structured Query Language (No-SQL), and the push system 620). For example, the messenger server 630 can manage a chartroom lifecycle and chatting members (e.g., create a chatroom, delete a chatroom, invite a member, enter a chatroom, leave a chatroom, expel a member, select a host role, or change a host). The messenger server 630 can deliver (e.g., transmit in realtime, store, restore, and deliver messages) messages to the chatroom members.

The messenger server 630 can receive various events regarding user accounts and user devices of the chatroom members, and process the events (e.g., withdraw account, change device properties, register a device, unregister a device). Example components of the messenger server 630 are described in greater detail below. According to an example embodiment, the messenger server 630 can be implemented as a separate server.

The messenger server 630 can include, for example, and without limitation, at least one of a backend connection manager 640, a session manager 650, a database 660, a message manager 670, and a push manager 680.

The backend connection manager 640 can manage the connection between the messenger server 630 and the proxy server 610.

When an access to the chatroom is required according to a request such as chatroom create, invite to chatroom, leave, enter, chat, or expel, the session manager 650 can define a session for the requested chatroom. The session manager 650 can manage user account information of the chatroom members and additional information such as TCP connection state of the members in the chat session, and process a request relating to the chat session.

The database 660 can store messenger/message related information. According to an example embodiment, the database 660 may be a separate database server connected to the messenger server 630, or implemented inside the messenger server 630. The database 660 may include a plurality of databases. The database 660 can store or include user information, device information, an inbox, a message box, and so on.

The message manager 670 can send general messages or control messages requested by the electronic device 200 or generated in the messenger server 630, to a recipient terminal. For doing so, the message manager 670 can provide abstraction for the storage operation to a higher component. For example, when the message manager 670 processes a message transmission request from the electronic device 200 to the external electronic device, the message manager 670 can store the message based on the message delivery to the external electronic device using the TCP or the push.

The message manager 670 can determine whether to store a message in the inbox or whether to cache a message in its in-memory based on the TCP connection state of the external electronic device. For example, instead of storing every message in the inbox, the message manager 670 can temporarily cache the message in the in-memory when the recipient terminal is TCP-connected and delete the data cached from the in-memory when a reception acknowledgement is received from the recipient terminal.

When the electronic device 200 and the proxy server 610 are TCP-disconnected, the push manager 680 can request push message transmission from the push system 620.

Examples describing various methods for, when images are delivered between electronic devices using such a messenger program, determining an image display order in a chat window of the messenger program are provided below.

According to various example embodiments, the electronic device 101 or 200 can include a display 160, a communication interface 170, and a processor 120. The processor 120 can receive a plurality of images including a first image and a second image in a first order from an external electronic device 102, 104, or 106 using the communication interface 170, arrange the first image and the second image in a second order at least based on first property information corresponding to the first image and second property information corresponding to the second image, and arrange and display the first image and the second image in the second order through the display 160.

According to various example embodiments, the processor 120 can receive the first property information or the second property information, as at least part of metadata of an image corresponding to the first image or the second image, from the external electronic device 102, 104, or 106.

According to various example embodiments, the processor 120 can receive property data corresponding to the images from the external electronic device 102, 104, or 106 using the communication interface, and use the property data as at least part of the first property information or the second property information.

According to various example embodiments, the processor 120 can determine the first property information or the second property information at least based on a character or a number contained in an image corresponding to the first image or the second image.

According to various example embodiments, the processor 120 can determine the first property information or the second property information at least based on change of at least one object contained in an image corresponding to the first image or the second image.

According to various example embodiments, when displaying the first image and the second image in the second order on the display, the processor 120 can overlap at least part of the first image and the second image.

According to various example embodiments, the processor 120 can arrange and display the first image and the second image in the second order through a messenger application of the electronic device 101 or 200.

According to various example embodiments, the at least part of the information can include an order defined by a user corresponding to the external electronic device for the first image and the second image.

According to various example embodiments, the at least part of the information can include at least one of a scene recognition result, a created time, and a file name of the first image and the second image.

According to various example embodiments, an electronic device 101 and 200 can include a communication interface 170, a memory 130 for storing a plurality of images including a first image and a second image, and a processor 120. The processor 120 can arrange the first image and the second image in a first order at least based on first property information corresponding to the first image and second property information corresponding to the second image, and send the first image and the second image in the first order to an external electronic device using the communication interface.

According to various example embodiments, the processor 120 can send the first property information or the second property information, as at least part of metadata of an image corresponding to the first image or the second image, to the external electronic device 102, 104, or 106.

According to various example embodiments, the processor 120 can determine the first property information or the second property information at least based on a character or a number contained in an image corresponding to the first image or the second image.

According to various example embodiments, the at least part of the information can include at least one of an order defined by a user corresponding to the external electronic device for the first image and the second image, a scene recognition result, a created time, and a file name of the first image and the second image.

FIGS. 7A and 7B are diagrams depicting an example image display order determined by a user's selection in an electronic device according to an example embodiment of the present disclosure.

When the electronic device 200 transmits images to the external electronic device using a messenger program, various methods can be used to select the images to send. For example, the user can execute the messenger program, select the other party for receiving the image, and attach the images to send using an image attach function. The user may select images to send in a gallery and then execute the messenger program.

The user can select the images in various manners. For example, when a display 710 is a touch screen, the user can select images by directly touching them or release his/her selection by re-touching images on the display 710. When the display 710 is not a touch screen, the user can select or unselect an image on the display 710 using a separate physical key.

Referring first to FIG. 7A, the electronic device 200 can display a plurality of images 730 on the display 710. For example, the display 710 can display nine images. The user can see hidden images on the current display 710 by selecting a point of a scrollbar 720 or moving a guide 725 of the scrollbar 720.

According to an example embodiment, the user can select images to send to the external electronic device among the images 730 on the display 710. As such, the user can see the hidden images and select the images to send to the external electronic device on the display 710 using the scrollbar 720 and the guide 725.

While the images are displayed on the display 710, the user can determine an order in which the images are displayed in the external electronic device in various manners. For example, the user may select images to send and concurrently determine their order. The user can select all of the transmit images and then determine the order of the selected images all over again. The ordering is not limited to those methods.

When the user selects images to send and concurrently determines their order, the order in which the user selects the transmit images can be the order in which the images are displayed in the external electronic device.

According to various example embodiments, the electronic device 200 can display the images 730 on the display 710 in FIG. 7A. The user can select images to send to the external electronic device among the displayed images 730. In this example, the order in which the user selects the images can be the order in which the images are displayed in the external electronic device.

According to an example embodiment, when the user selects an image, the selected image becomes translucent and a mark object 732 (e.g., V) indicating the selection can be superimposed on the selected image. An order object 735 (e.g., a number) can be superimposed on the selected image. The order object 735 can indicate the order of the image to be displayed in the external electronic device. When the user re-selects (e.g., touch, double click) the selected image, the corresponding image can be unselected (e.g., delete the mark object 732 and/or the order object 735) and advance the images selected later than the corresponding image (e.g., change the display order of the order object 735).

When the user selects the images to send and then re-determines the order of the selected images, the order in which the user selects the images can be different from the order in which the images are displayed in the external electronic device.

According to various example embodiments, the electronic device 200 can display the images 730 on the display 710 as illustrated in FIG. 7A. The user can select images to send to the external electronic device among the displayed images 730. The user can determine the display order of the selected images for the external electronic device.

According to an example embodiment, when the user selects an image, the selected image becomes translucent and a mark object 732 (e.g., V) indicating the selection can be superimposed on the selected image. To define the display order of the selected images in the external electronic device, the user can re-select the selected images. When the user re-reselects the selected image, the order object 735 (e.g., a number) can be superimposed on the selected image together with the mark object 732. The order object 735 can indicate the order of the image to be displayed in the external electronic device. When the user re-selects (e.g., touch, double click) the selected image, the corresponding image can be unselected and advance the images selected later than the corresponding image.

Referring to FIG. 7B, the electronic device 200 can display one image 740 in an area of the display 710 and images 760 selected by the user in another area of the display 710. When the user views the image 740 displayed in the one area and his/her intended image to send to the external electronic device is displayed, the user can select the image by selecting an attach icon 750 in another area. The selected images 760 can be assembled in order and displayed in the other area.

An order display 765 (e.g., a number) can be superimposed on the selected images 760 in the selected order.

According to an example embodiment, once the user selects the image, the electronic device 200 can immediately send the image to the external electronic device. When receiving an acknowledgement of the transmitted image from a user of the external electronic device, the electronic device 200 can display, but not limited to, an acknowledgement indicator 770 on the transmitted image. When the user selects all of the images and inputs a separate transmission signal, the electronic device 200 may transmit the selected image 760 all together.

According to an example embodiment, when satisfying a condition defined by the user, the electronic device 200 can transmit an image selected by the user to the external electronic device. For example, the electronic device 200 can identify one or more images 760 selected by the user input for the transmission to the external electronic device, and send the one or more images 760 to the external electronic device when the condition (e.g., a particular location or a particular time, etc.) defined by the user is satisfied. The particular location can include, for example, a user's home, office, or Point Of Interest (POI), and the particular time can include, for example, a time zone (e.g., Seoul, South Korea Greenwich Mean Time (GMT)+9 or Paris, France GMT+1) of the electronic device 200.

The electronic device 200 can analyze the images, and thus determine the display order of the images in the external electronic device or discover images to display in proximity. For example, when image or image metadata includes the image order information, the electronic device 200 can determine the order in which the images are displayed in the external electronic device using the order information. The metadata is data of an image file based on rules, and can include location and contents of the image file, content creator information, and use details. When the image itself or the image metadata includes similarity information of the images, the electronic device 200 may display the images in the external electronic device by grouping similar images using the similarity information.

In addition to the order determined by the user, descriptions explaining an example method of the electronic device 200 for, when the user of the electronic device 200 sends a plurality of images using the messenger program, determining an order of the images or determining images to group are provided.

FIGS. 8A and 8B are diagrams depicting an example image display order of an external electronic device, determined based on an image property in an electronic device according to an example embodiment of the present disclosure.

In FIG. 8A, the electronic device 200 can display a plurality of images on a display 810. A messenger program can select images to send to an external electronic device 200' (e.g., the first external electronic device 102, the second external electronic device 104, or the server 106). The user can select images to send to the external electronic device 200' among the displayed images.

The user can select a first image 820 and a second image 830 from the displayed images. The electronic device 200 can analyze the selected images 820 and 830 and thus determine an order in which the images are received and displayed in a messenger program of the external electronic device 200'.

For example, the electronic device 200 can, but not limited to, capture a document including letters and determine that the current image includes many letters using a scene recognition algorithm. The electronic device 200 may scan a captured image and determine that the image includes letters. In every image capturing, the electronic device 200 can add the recognized scene information to metadata of an image file.

When the images 820 and 830 selected by the user to send to the external electronic device 200' include many letters, the electronic device 200 can determine whether a series of numbers (e.g., page number) is written at a particular location of the images.

For example, the electronic device 200 can determine that the first image 820 and the second image 830 include many letters and determine whether there is a series of numbers at the bottom or the top of the first 820 and the second image 830. A series of the numbers can be, for example, page numbers of the document.

Based on the determined numbers, the electronic device 200 can determine the order in which the transmit images are displayed in the external electronic device 200'. For example, the electronic device 200 can compare the number 24 825 of the first image 820 with the number 25 835 of the second image 830 and thus determine that the first image 820 should be displayed before the second image 830. As explained with reference to FIG. 5, when sending the images to the external electronic device 200', the electronic device 200 can also transmit the determination result.

In FIG. 8B, the external electronic device 200' can display the received images 820 and 830 on a display 810'. When the electronic device 200 and the external electronic device 200' transmit images using the messenger program, the images can be displayed in a chatroom of the messenger program.

The external electronic device 200' can display the images based on, but not limited to, the image display order information received from the electronic device 200 together with the images. In some cases, the external electronic device 200' may determine the display order of the received images 820 and 830.

For example, the external electronic device 200' can display the first image 820 and the second image 830 in this order. For example, the external electronic device 200' can display the images 820 and 830 based on the order obtained from the electronic device 200 based on the scene recognition result of the first image 820 and the second image 830.

As such, according to this example embodiment of the present disclosure, without user's particular direction, the electronic device 200 can determine the image display order of the external electronic device 200' based on the property information of the images transmitted to the external electronic device 200'.

Figure 9B:
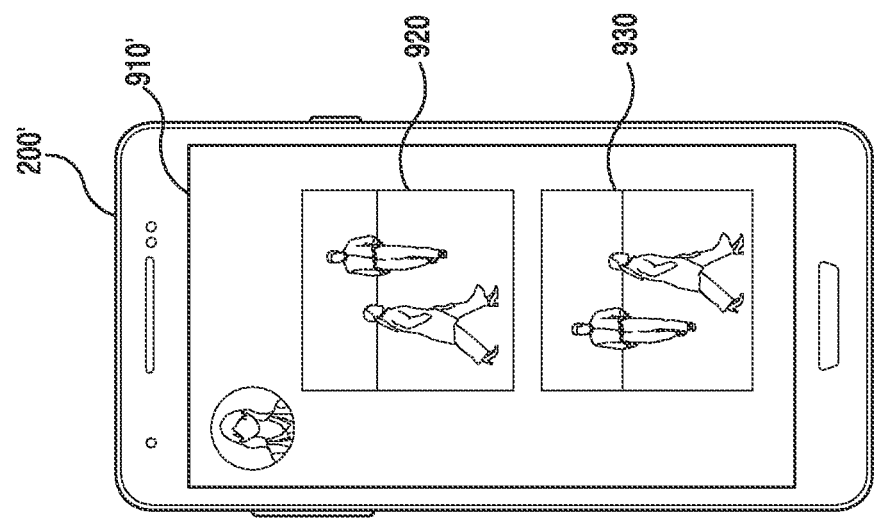
FIGS. 9A and 9B are diagrams illustrating an example image display order determined in an electronic device based on another image property according to an example embodiment of the present disclosure.
Figure 9A:
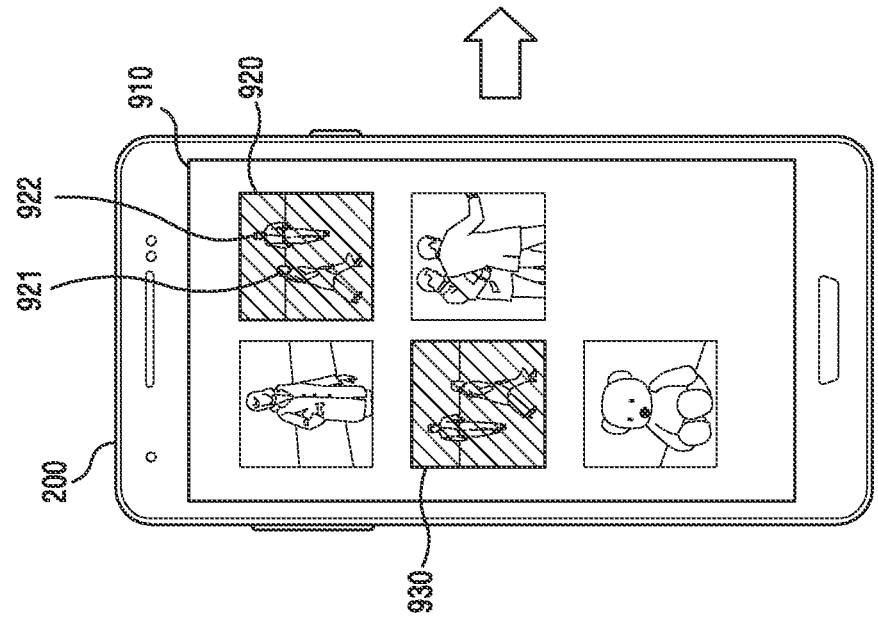

FIGS. 9A and 9B are diagrams depicting an example image display order of an external electronic device determined based on image property in an electronic device according to an example embodiment of the present disclosure.

Referring to FIG. 9A, the electronic device 200 can display a plurality of images on a display 910. A messenger program in FIG. 9A selects images to send to the external electronic device 200' (e.g., the first external electronic device 102, the second external electronic device 104, or the server 106). The user can select images to send to the external electronic device 200' among the displayed images.

The user can select a first image 920 and a second image 930 from the displayed images. The electronic device 200 can analyze the selected images 920 and 930 and determine an order in which the images 920 and 930 are received and displayed in a messenger program of the external electronic device 200'.

In FIG. 9A, the first image 920 includes a first object 921 and a second object 922. When viewed from front of the first image 920, the first object 921 is on the left of the second object 922. The electronic device 200 can capture the first image 920 and determine a sport mode where the first object 921 is moving using the scene recognition algorithm. The electronic device 200 can store the determined scene information in metadata of the image. Likewise, the electronic device 200 can determine the second image 930 in the sport mode as well. In every image capturing, the electronic device 200 can add the recognized scene information to the metadata of an image file.

The electronic device 200 can compare the first image 920 and the second image 930. In detail, the electronic device 200 can determine that both of the images 920 and the 930 are recognized and captured in the sport mode including the moving object, and that the first image 920 should be displayed before the second image 930 based on the movement of the first object 921 from left to right based on the second object 922.

According to an example embodiment, after scanning the image, the electronic device 200 can determine, for example, a change of the object based on the order in the image. For example, the electronic device 200 can determine the order of the first image 920 and the second image 930 based on the motion or the movement of the first object 921 in the first image 920 and the second image 930. As illustrated in FIG. 5, the electronic device 200 can transmit the images together with the determination result to the external electronic device 200'.

Referring to FIG. 9B, the external electronic device 200' can display the received images 920 and 930 on a display 910'. When the electronic device 200 and the external electronic device 200' send images using the messenger program, the images can be displayed in a chatroom of the messenger program.

The external electronic device 200' can display the images based on, but not limited to, the image display order information received from the electronic device 200 together with the images. In some cases, the external electronic device 200' may determine the display order of the received images 920 and 930.

For example, the external electronic device 200' can display the first image 920 and the second image 930 in this order. For example, the external electronic device 200' can display the images 920 and 930 based on the order obtained from the electronic device 200 based on the scene recognition result of the first image 920 and the second image 930.

As such, according to this example embodiment of the present disclosure, without user's particular direction, the electronic device 200 can determine the image display order of the external electronic device 200' based on the property information of the images transmitted to the external electronic device 200'.

FIGS. 10A and 10B are diagrams depicting an example image display order of an external electronic device 200' determined in an electronic device based on an image file name according to an example embodiment of the present disclosure.

Referring to FIG. 10A, the electronic device 200 can display a plurality of images on a display 1010. A messenger program in FIG. 10A can select images to send to the external electronic device 200'. The user can select images to send to the external electronic device 200' among the displayed images.

The user can select a first image 1020 and a second image 1030 from the displayed images. The electronic device 200 can analyze the selected images 1020 and 1030 and thus determine an order in which the images 1020 and 1030 are received and displayed in a messenger program of the external electronic device 200'.

For example, the electronic device 200 can determine the display order using image file names. The electronic device 200 can arrange a file name "data 2" of the first image 1020 and a file name "data 1" of the second image 1030 in ascending order. Based on, but not limited to, the ascending order of the file name, the second image 1030 can be displayed before the first image 1020 on the display 1010' of the external electronic device 200' regardless of the order selected by the user. The file names can be arranged in descending order or based on other criterion. As illustrated in FIG. 5, the electronic device 200 can transmit the images together with the image order determination result to the external electronic device 200'.

Referring to FIG. 10B, the external electronic device 200' can display the received images 1020 and 1030 on a display 1010'. When the electronic device 200 and the external electronic device 200' send images using the messenger program, the images can be displayed in the chatroom of the messenger program.

The external electronic device 200' can display the images based on, but not limited to, the image display order information received from the electronic device 200 together with the images. In some cases, the external electronic device 200' may determine the display order of the received images 1020 and 1030.

For example, the external electronic device 200' can display the second image 1030 above the first image 1020. For example, the external electronic device 200' receives the order information for arranging the file names (e.g., data 1, data 2) the first image 1020 and the second image 1030 in ascending order, from the electronic device 200, and displays the images 1020 and 1030 in the corresponding order.

As such, according to this example embodiment of the present disclosure, without user's particular direction, the electronic device 200 can determine the image display order of the external electronic device 200' based on the property information of the images transmitted to the external electronic device 200'.

FIGS. 11A and 11B are diagrams depicting an example image display order of an external electronic device determined in an electronic device based on an image file created time according to an example embodiment of the present disclosure.

Referring to FIG. 11A, the electronic device 200 can display a plurality of images on a display 1110. A messenger program in FIG. 11A can select images to send to the external electronic device 200'. The user can select images to send to the external electronic device 200' among the displayed images.

The user can select a first image 1120, a second image 1130, and a third image 1140 from the displayed images. The electronic device 200 can analyze the selected images 1120, 1130, and 1140, and thus determine an order in which the images 1120, 1130, and 1140 are received and displayed in a messenger program of the external electronic device 200'.

For example, the electronic device 200 can determine the display order using an image file created time, for example, an image captured time. The electronic device 200 can arrange the captured time "AM 10:00" of the first image 1120, the captured time "PM 3:00" of the second image 1130, and the captured time "AM 10:30" of the third image 1140 in ascending order. Based on, but not limited to, the ascending order of the image captured time, the first image 1120, the third image 1140, and the second image 1130 can be displayed in this order on the display 1110' of the external electronic device 200' regardless of the order selected by the user. The image captured times can be arranged in descending order or based on other criterion. As illustrated in FIG.

5, the electronic device 200 can transmit the images together with the image order determination result to the external electronic device 200'.

Referring to FIG. 11B, the external electronic device 200' can display the received images 1120, 1130, and 1140 on a display 1110'. When the electronic device 200 and the external electronic device 200' transmit images using the messenger program, the images can be displayed in the chatroom of the messenger program.

The external electronic device 200' can display the images based on, but not limited to, the image display order information received from the electronic device 200 together with the images. In some cases, the external electronic device 200' may determine the display order of the received images 1120, 1130, and 1140.

For example, the external electronic device 200' can display the first image 1120, the third image 1140, and the second image 1130 in this order. For example, the external electronic device 200' receives the order information for arranging the captured time of the first image 1120, the second image 1130, and the third image 1140 in ascending order, from the electronic device 200, and displays the images 1120, 1130, and 1140 in the corresponding order.

As such, according to this example embodiment of the present disclosure, without user's particular direction, the electronic device 200 can determine the image display order of the external electronic device 200' based on the property information of the images transmitted to the external electronic device 200'.

Figure 12B:
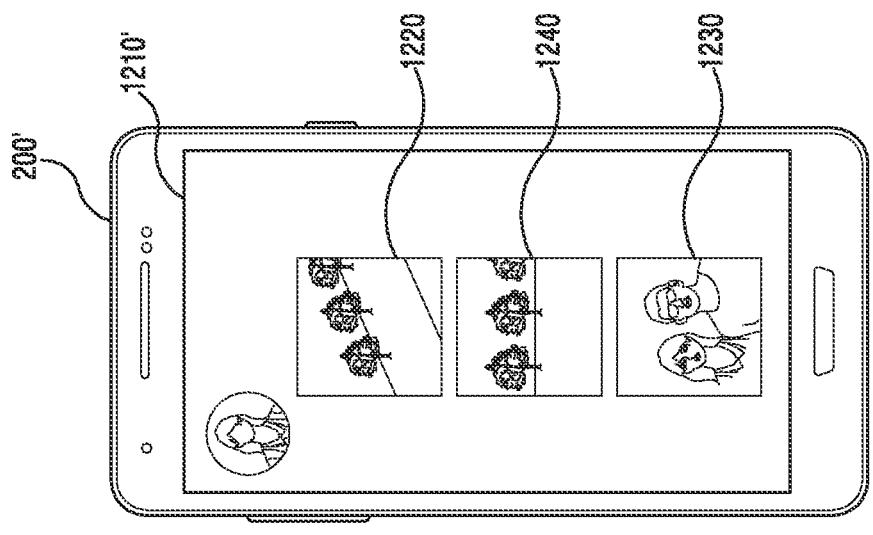
FIGS. 12A and 12B are diagrams illustrating an example image display order determined in an electronic device based on an image created location according to an example embodiment of the present disclosure.
Figure 12A:
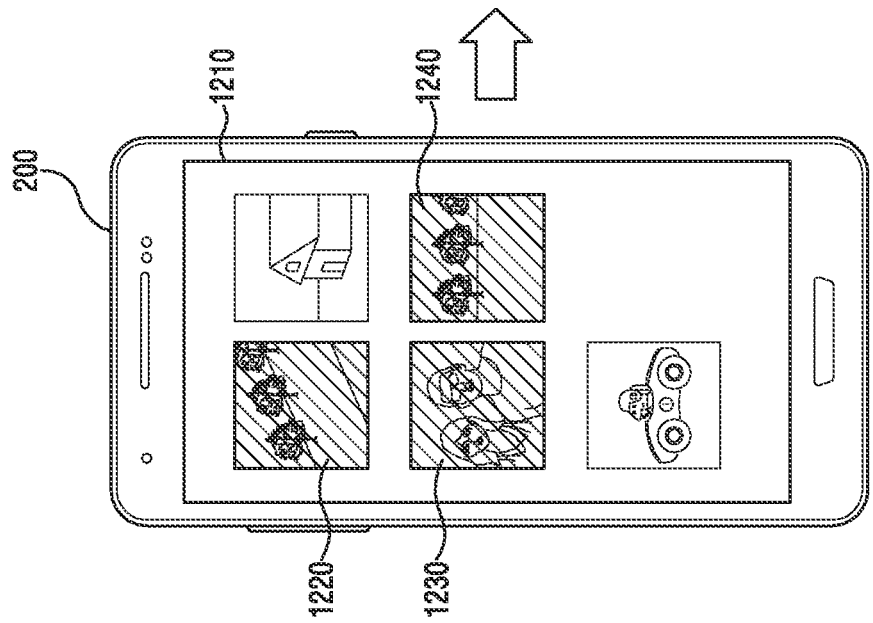

FIGS. 12A and 12B are diagrams depicting an example image display order of an external electronic device determined in an electronic device based on an image created location according to an example embodiment of the present disclosure.

Referring to FIG. 12A, the electronic device 200 can display a plurality of images on a display 1210. A messenger program in FIG. 12A can select images to send to the external electronic device 200'. The user can select images to send to the external electronic device 200' among the displayed images.

The user can select a first image 1220, a second image 1230, and a third image 1240 from the displayed images. The electronic device 200 can analyze the selected images 1220, 1230, and 1240, and thus determine an order in which the images 1220, 1230, and 1240 are received and displayed in the messenger program of the external electronic device 200'.

For example, the electronic device 200 can determine the display order using an image file created location, for example, an image captured location. The image captured location can be measured, for example, using a GPS module (e.g., the GNSS module 1927 of FIG. 19) of the electronic device 200. For every image capturing, the electronic device 200 can add the captured location information to metadata of an image file.

The electronic device 200 can set the first image 1220 and the third image 1240 of the similar captured locations as one group, and set the second image 1230 of the different captured location as another group among the selected images 1220, 1230, and 1240. Based on, but not limited to, the image captured location, the first image 1220, the third image 1240, and the second image 1230 can be displayed in this order on the display 1210' of the external electronic device 200' regardless of the order selected by the user. The second image 1230 may be displayed first, and then the first image 1220 and the third image 1240 may be displayed. As illustrated in FIG. 5, the electronic device 200 can transmit the images together with the image order determination result to the external electronic device 200'.

Referring to FIG. 12B, the external electronic device 200' can display the received images 1220, 1230, and 1240 on a display 1210'. When the electronic device 200 and the external electronic device 200' transmit images using the messenger program, the images can be displayed in the chatroom of the messenger program.

The external electronic device 200' can display the images based on, but not limited to, the image display order information received from the electronic device 200 together with the images. In some cases, the external electronic device 200' may determine the display order of the received images 1220, 1230, and 1240.

For example, the external electronic device 200' can display the first image 1220, the third image 1240, and the second image 1230 in this order. For example, the external electronic device 200' can receive from the electronic device 200 the group information of the images 1220, 1230, and 1240 based on the captured locations of the first image 1220, the second image 1230, and the third image 1240, and display the images 1220, 1230, and 1240 in the corresponding order.

As such, according to this example embodiment of the present disclosure, without user's particular direction, the electronic device 200 can determine the image display order of the external electronic device 200' based on the property information of the images transmitted to the external electronic device 200'.

FIGS. 13A and 13B are diagrams depicting an example image display order of an external electronic device determined in an electronic device based on a scene recognition result of an image file according to an example embodiment of the present disclosure.

Referring to FIG. 13A, the electronic device 200 can display a plurality of images on a display 1310. A messenger program in FIG. 13A can select images to send to the external electronic device 200'. The user can select images to send to the external electronic device 200' among the displayed images.

The user can select a first image 1320, a second image 1330, and a third image 1340 from the displayed images. The electronic device 200 can analyze the selected images 1320, 1330, and 1340 and thus determine an order in which the images 1320, 1330, and 1340 are received and displayed in a messenger program of the external electronic device 200'.

For example, the electronic device 200 can determine the display order using a scene recognition result of an image file. The image scene recognition result can be determined using the scene recognition algorithm of the electronic device 200. For example, when an image input through a camera include a person, the electronic device 200 can determine a portrait mode of the image. Also, the electronic device 200 can determine a landscape mode of the image based on an exposure value of the input image and a distance value of an object. For every image capturing, the electronic device 200 can store the determined image scene information in metadata of the image file.

The electronic device 200 can set the second image 1330 and the third image 1340 of the same scene information as one group, and set the first image 1320 of the different scene information as another group among the selected images 1320, 1330, and 1340. For example, the second image 1330 and the third image 1340 can be the portrait scene, and the first image 1320 can be the landscape scene.

Based on, but not limited to, the image scene information, the third image 1340, the second image 1330, and the first image 1320 can be displayed in this order on the display 1310' of the external electronic device 200' regardless of the order selected by the user. The first image 1320 may be displayed first, and then the second image 1330 and the third image 1340 may be displayed. As illustrated in FIG. 5, the electronic device 200 can transmit the images together with the image order determination result to the external electronic device 200'.

Referring to FIG. 13B, the external electronic device 200' can display the received images 1320, 1330, and 1340 on the display 1310'. When the electronic device 200 and the external electronic device 200' transmit images using the messenger program, the images can be displayed in the chatroom of the messenger program.

The external electronic device 200' can display the images based on, but not limited to, the image display order information received from the electronic device 200 together with the images. In some cases, the external electronic device 200' may determine the display order of the received images 1320, 1330, and 1340.

For example, the external electronic device 200' can display the third image 1340, the second image 1330, and the first image 1320 in this order. For example, the external electronic device 200' can receive from the electronic device 200 the group information of the images 1320, 1330, and 1340 based on the captured locations of the first image 1320, the second image 1330, and the third image 1340, and display the images 1320, 1330, and 1340 in the corresponding order.

As such, according to this example embodiment of the present disclosure, without user's particular direction, the electronic device 200 can determine the image display order of the external electronic device 200' based on the property information of the images transmitted to the external electronic device 200'.

So far, the order of the images to be displayed in the external electronic device 200' has been determined based on the property information of the images, for example, based on the display order defined by the user, the image created time, the image created location, and the image scene information in the image metadata. Various example methods for displaying received images in an electronic device based on the display order of the images shall be described in greater detail below.

FIGS. 14A and 14B are diagrams depicting example received images overlapped with each other in an electronic device according to an example embodiment of the present disclosure.

Referring to FIG. 14A, the electronic device 200 can display a plurality of received images 1420. In FIG. 14A, images received are displayed in a messenger program. The received images can have the same property information as stated in FIG. 8 through FIG. 13. At least part of the received images 1420 can be overlapped, but not limited to, horizontally. The received images 1420 may be overlapped vertically or diagonally. The user can set to overlap part of the received images 1420 in, but not limited to, settings. When the electronic device 200 determines that all of the received images 1420 are not displayed on a display 1410, part of the received images 1420 may be automatically overlapped with each other.

The images 1420 can be overlapped and displayed in the received order. For example, the first image 1420-1 can be received first of all and the fourth image 1420-4 can be received last. The fourth image 1420-4 received last can mark a first object 1425 indicating the total number of the received images and a second object 1421 indicating its order using numbers. The other images 1420-1, 1420-2, and 1420-3 than the fourth image 1420-4 received last can mark their order using a second object 1422.

The user can view the overlapping images by touching and dragging the partially overlapping images 1420. Referring to FIG. 14B, the user can touch-and-drag from a first point 1430a to a second point 1430b. The first point 1430a can show part of the third image 1420-3 in FIG. 14A. For example, the user who wants to view the second image 1420-2 can view the second image 1420-2 by touching the third image 1420-3 and then dragging to right.

In FIG. 14B, the user can view the second image 1420-2 by touching the third image 1420-3 and then dragging up to the second point 1430b. In this example, both of the third image 1420-3 and the fourth image 1420-4 can be pushed to the right. The user can view his/her desired image by touching and dragging other image.

As such, the electronic device 200 overlaps part of the received images 1420 in order on the display 1410, and the user can view the total number of the received images and contents of the images at a glance without having to scroll the chat window up or down to view the listed images.

Figures 15A, 15B:
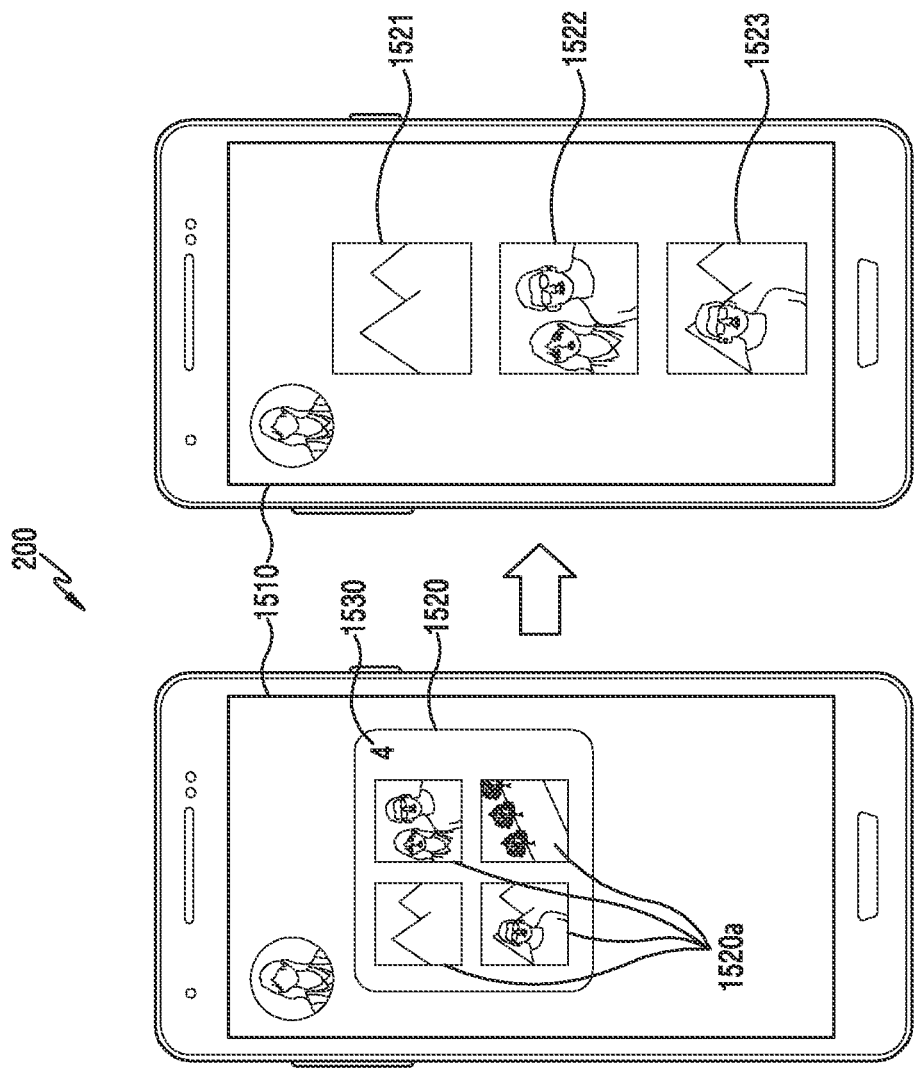
FIGS. 15A and 15B are diagrams illustrating example received images displayed in groups in an electronic device according to an example embodiment of the present disclosure.

FIGS. 15A and 15B are diagrams depicting example received images displayed in groups in an electronic device electronic device according to an example embodiment of the present disclosure.

Referring to FIG. 15A, the electronic device 200 can display a plurality of received images. In FIG. 15A, images received can be displayed in a messenger program.

According to various embodiments, the received images can be displayed in a bubble 1520. The bubble 1520 can mark the total number 1530 of the received images using, but not limited to, a number (e.g., "4").

The received images in the bubble 1520 can have the same property information as mentioned in FIG. 8 through FIG. 13. The received images can be displayed as small images 1520a in the single bubble 1520. The small images 1520a in the bubble 1520 can be thumbnail images or screen nail images in the received images. The electronic device 200 may reduce and display the received images by considering an occupancy rate of the bubble 1520 in the display 1510 and the number of the received images. The small images 1520a in the bubble 1520 can be displayed in, but not limited to, the received order.

The user can view the received images by selecting the bubble 1520. The user can select the bubble 1520 by directly touching the display 1510 showing the bubble 1520 or by using a separate physical key. In FIG. 15B, the user can select (e.g., touch, double touch, force touch, long press, touch and drag, gesture, or drag and drop) the bubble 1520 and thus display the images of the bubble 1520 on the display 1510. Three of the four received images 1521, 1522, and 1523 in the bubble 1520 can be listed vertically on the display 1510. The other image not displayed on the display 1510 among the four received images of the bubble 1520 can be viewed by, but not limited to, scrolling. All of the images of the bubble 1520 may be displayed based on a size of the display 1510, or some of the images may be overlapped as described in FIG. 14.

As above, the electronic device 200 can display the received images in the bubble 1520 on the display 1510 and show the reduced-size images 1520a of the received images in the bubble 1520. Hence, the user can view the total number of the received images and contents of the images at a glance without having to scroll the chat window up or down in order to view the listed images.

FIGS. 16A and 16B are diagrams depicting example received images displayed in groups in an electronic device electronic device according to an example embodiment of the present disclosure.

Referring to FIG. 16A, the electronic device 200 can group a plurality of received images and display them as an album 1620. In FIG. 16A, images received can be displayed in a messenger program. The album 1620 can display an object 1630 indicating the total number of the received images using a number. The present disclosure is not limited to such an album.

The received images in the album 1620 can have the same property information as described in FIG. 8 through FIG. 13. A title may be added to the album 1620. The user may input a title of the album 1620. The electronic device 200 may analyze the received images and create a title of the album 1620. For example, when a captured location of the received images is identical (e.g., Hawaii), the electronic device 200 can generate a title with the captured location. When a captured date of the received images is identical, the electronic device 200 may generate the title with the captured date.

The user can view the received images by selecting the album 1620. The user can select the album 1620 by directly touching the display 1610 showing the album 1620 or by using a separate physical key. In FIG. 16B, the user can select the album 1620 and thus display the images of the album 1620 on the display 1610. Received images 1621, 1622, and 1623 can be listed, but not limited to, vertically on the display 1610. Some of the received images may be overlapped as described in FIG. 14.

As above, the electronic device 200 can display the received images 1621, 1622, 1623 in the album 1620 on the display 1610. Hence, the user can obtain the common properties of the received images 1621, 1622, 1623 without having to check the received images 1621, 1622, 1623 one by one.

Figure 17:
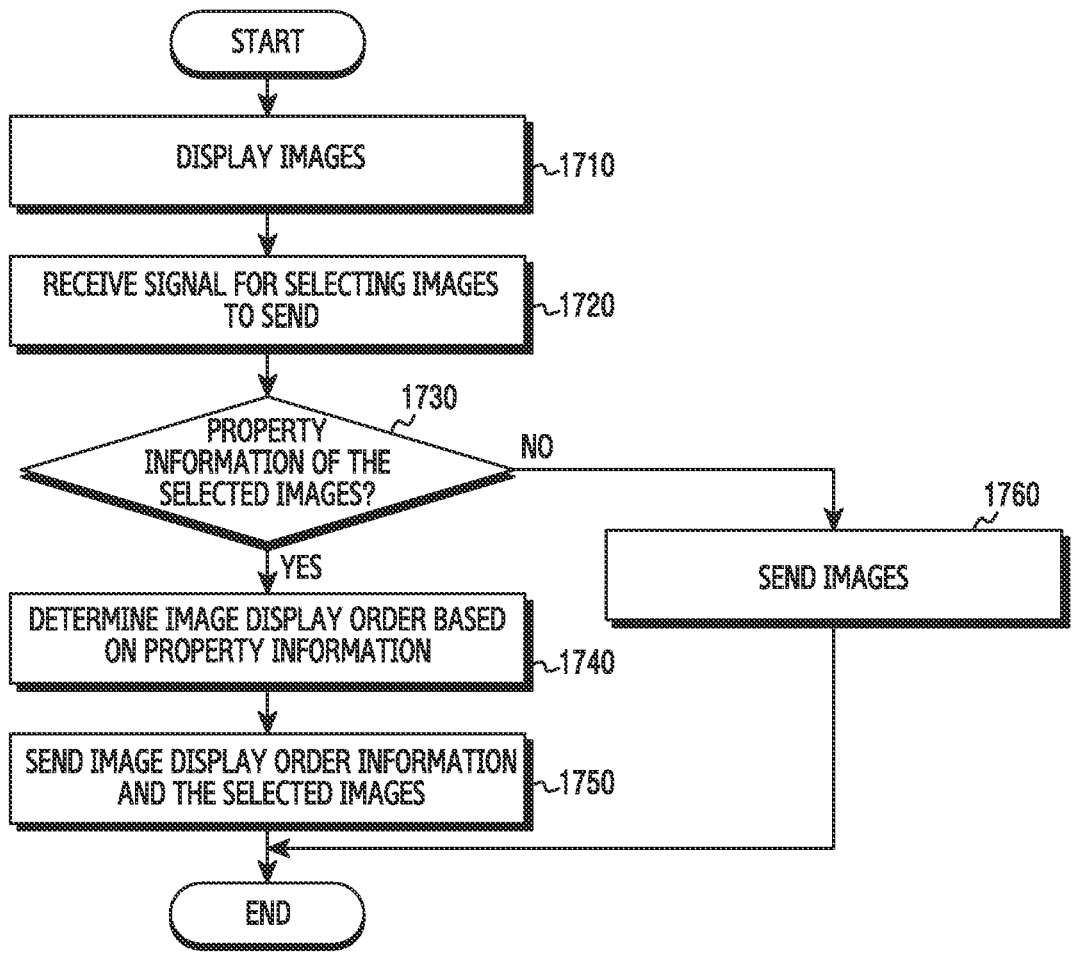
FIG. 17 is a flowchart illustrating an example method for selecting images to send in an electronic device according to an example embodiment of the present disclosure.

FIG. 17 is a flowchart illustrating an example method for selecting images to send in an electronic device according to an example embodiment of the present disclosure.

Referring to FIG. 17, the electronic device 200 (e.g., the processor 120 or 410) can display images in operation 1710. The electronic device 200 can display images to receive a signal which selects images to send to the external electronic device 200'.

The electronic device 200 (e.g., the processor 120 or 410) can receive the signal which selects images to send to the external electronic device 200' in operation 1720. The user can select the images to send to the external electronic device 200' using, for example, touch or a separate physical key.

The electronic device 200 (e.g., the processor 120 or 410) can determine whether the selected images have property information in operation 1730. The property information can include, but not limited to, a display order defined by the user for the images, scene recognition result stored in metadata of the image, a captured time of the image, a captured location of the image, and a file name of the image. The property information may include other information indicating the property of the image.

When the image file includes the property information, the electronic device 200 (e.g., the processor 120 or 410) can determine the image display order of the external electronic device 200' based on the property information in operation 1740. For example, the images can be listed in ascending order of the captured time or in ascending order of the image file name. Also, the images may be grouped using the image captured location or the scene recognition result in the image metadata.

When sending the selected images to the external electronic device 200', the electronic device 200 (e.g., the processor 120 or 410) can also send the determined display order or the grouping result in operation 1750. The electronic device 200 may send the image itself or a copy of the image. In this example, a size or a capacity of the image may be adjusted according to a network state or regulations of the messenger program application which delivers the image.

When the image file does not include the property information, the electronic device 200 (e.g., the processor 120 or 410) can send the images to the external electronic device 200' based on an arbitrary criterion in operation 1760. The arbitrary criterion can include, for example, the size, the capacity, or a type of the image file.

Figure 18:
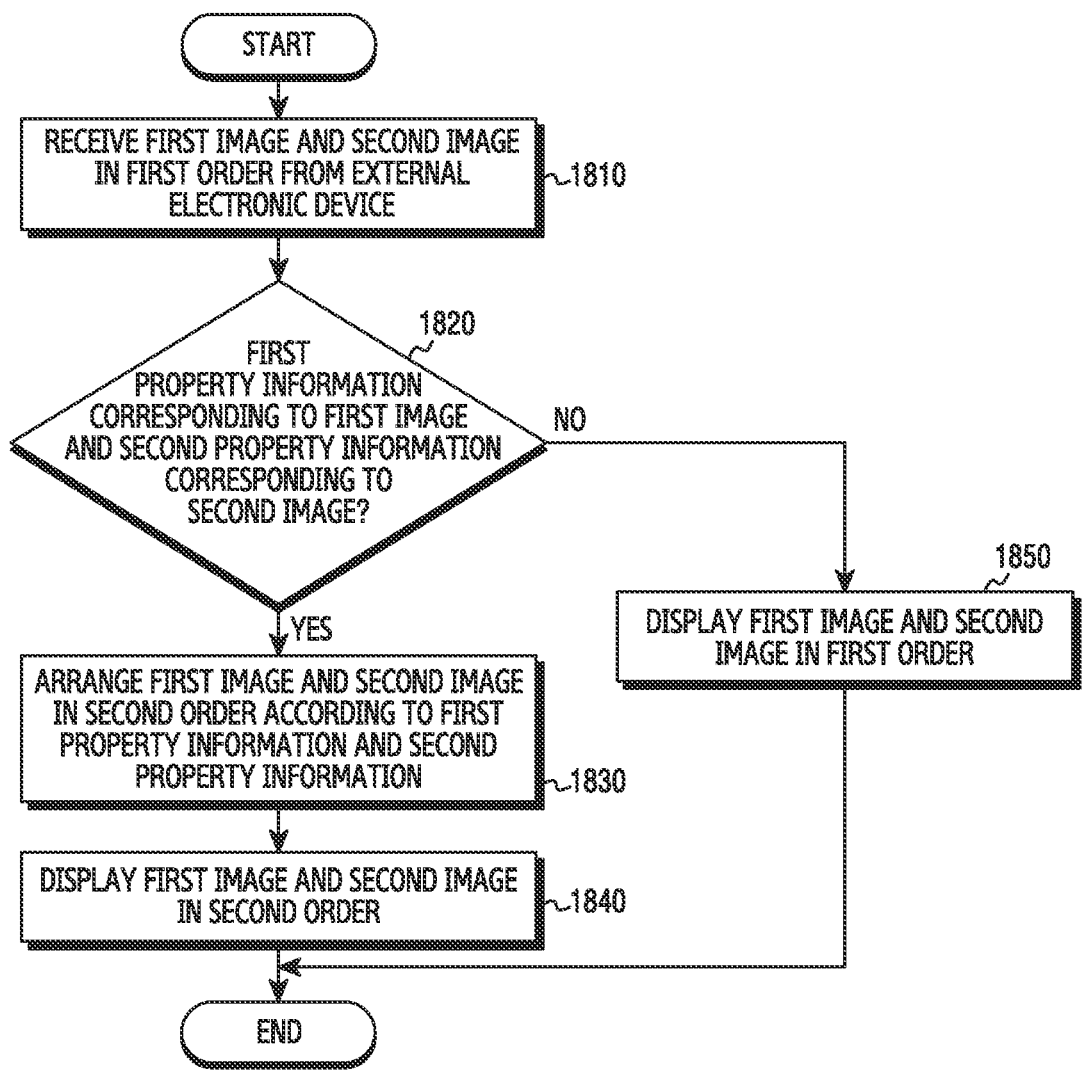
FIG. 18 is a flowchart illustrating an example method for displaying received images in an electronic device according to an example embodiment of the present disclosure.

FIG. 18 is a flowchart illustrating an example method for displaying received images in an electronic device according to an example embodiment of the present disclosure.

Referring to FIG. 18, the electronic device 200 (e.g., the processor 120 or 410) can receive a first image and a second image in a first order from the external electronic device 200' in operation 1810. The first order can be an image display order randomly determined by the external electronic device 200'. The electronic device 200 (e.g., the processor 120 or 410) can determine whether there are first property information corresponding to the first image and second property information corresponding to the second image in operation 1820. The property information can include, but not limited to, a display order defined by the user for the images, scene recognition result stored in metadata of the image, an image captured time, an image captured location, and a file name of the image. The property information may include other information indicating the property of the image.

The electronic device 200 (e.g., the processor 120 or 410) can arrange the first image and the second image in a second order based on the first property information and the second property information in operation 1830. For example, images can be listed in ascending order of the captured time or in ascending order of the image file name. Also, the images may be grouped using the image captured location or the scene recognition result in the image metadata. The electronic device 200 (e.g., the processor 120 or 410) can display the first image and the second image in the second order in operation 1840.

Without the first property information corresponding to the first image and second property information corresponding to the second image, the electronic device 200 (e.g., the processor 120 or 410) can arrange and display the first image and the second image in the first order in operation 1850.

The operations 1710 through 1760 or 1810 through 1850 described in the processes or the methods of FIG. 17 and FIG. 18 can be executed in a sequential, parallel, repetitive, or heuristic manner. For example, some operations can be executed in a different order or be omitted, or other operations can be added.

According to various example embodiments, an image control method in an electronic device 101 or 200 can include receiving a plurality of images including a first image and a second image in a first order from an external electronic device 102, 104, or 106 using a communication interface 170 functionally coupled to the electronic device 101 or 200, arranging the first image and the second image in a second order at least based on first property information corresponding to the first image and second property information corresponding to the second image, and arranging and displaying the first image and the second image in the second order through a display 160 functionally coupled to the electronic device.

According to various example embodiments, receiving the images in the first order can include receiving the first property information or the second property information, as at least part of metadata of an image corresponding to the first image or the second image, from the external electronic device 102, 104, or 106.

According to various example embodiments, receiving the images in the first order can include receiving property data corresponding to the images from the external electronic device 102, 104, or 106 using the communication interface 170, and using the property data as at least part of the first property information or the second property information.

According to various example embodiments, arranging the first image and the second image in the second order can include determining the first property information or the second property information at least based on a character or a number contained in an image corresponding to the first image or the second image.

According to various example embodiments, arranging and displaying the first image and the second image in the second order can include overlapping at least part of the first image and the second image.

According to various example embodiments, arranging and displaying the first image and the second image in the second order can include can be performed through a messenger application of the electronic device 101 or 200.

According to various example embodiments, the at least part of the information can include an order defined by a user corresponding to the external electronic device 102, 104, or 106 for the first image and the second image.

According to various example embodiments, the at least part of the information can include at least one of a scene recognition result, a created time, and a file name of the first image and the second image.

According to various example embodiments, an image control method in an electronic device 101 or 200 including a memory 130 for storing a plurality of images including a first image and a second image, can include arranging the first image and the second image in a first order at least based on first property information corresponding to the first image and second property information corresponding to the second image, and sending the first image and the second image in the first order to an external electronic 102, 104, or 106 device using the communication interface 170.

According to various example embodiments, sending the first image and the second image in the first order to the external electronic 102, 104, or 106 can include sending the first property information or the second property information, as at least part of metadata of an image corresponding to the first image or the second image, to the external electronic device 102, 104, or 106.

According to various example embodiments, arranging the first image and the second image in the first order can include determining the first property information or the second property information at least based on a character or a number contained in an image corresponding to the first image or the second image.

According to various example embodiments, the at least part of the information can include at least one of an order defined by a user corresponding to the external electronic device for the first image and the second image, a scene recognition result, a created time, and a file name of the first image and the second image.

Figure 19:
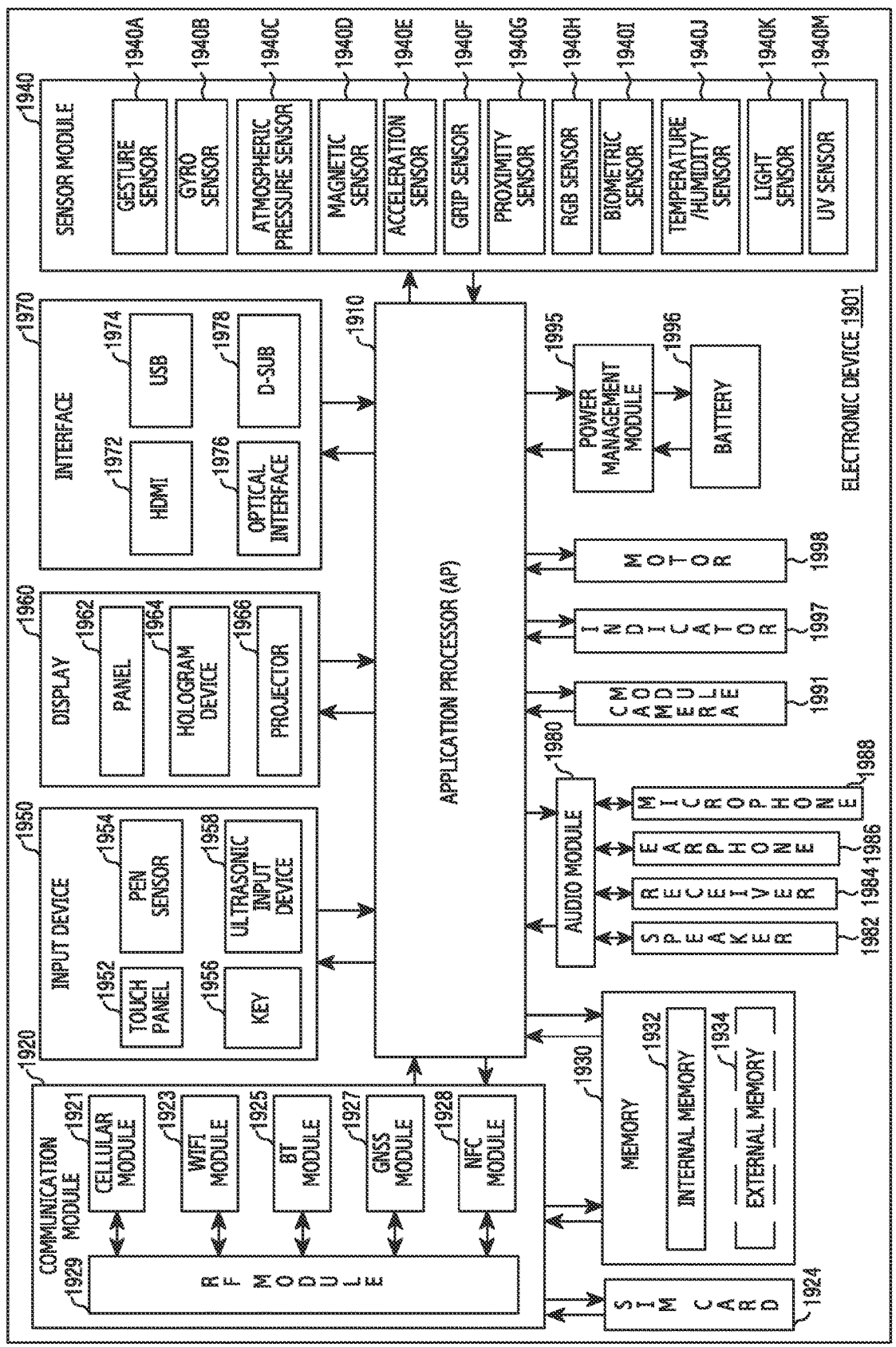
FIG. 19 is a block diagram illustrating an example electronic device according to various example embodiments of the present disclosure.

FIG. 19 is a block diagram illustrating an example electronic device according to various example embodiments of the present disclosure.

The electronic device 1901, for example, can include all or part of the electronic device 101 of FIG. 1. The electronic device 1901 can include one or more processors (APs) (e.g., including processing circuitry) 1910, a communication module (e.g., including communication circuitry) 1920, a Subscriber Identification Module (SIM) 1924, a memory 1930, a sensor module 1940, an input device (e.g., including input circuitry) 1950, a display 1960, an interface (e.g., including interface circuitry) 1970, an audio module 1980, a camera module 1991, a power management module 1995, a battery 1996, an indicator 1997, and a motor 1998.

The processor 1910, for example, may include various processing circuitry that can control a plurality of hardware or software components connected to the processor 1910 by executing an OS or an application program, and process various data and operations. The processor 1910 can be implemented with, for example, processing circuitry, a System on Chip (SoC), or the like, but is not limited thereto. According to an example embodiment, the processor 1910 can further include a Graphic Processing Unit (GPU) and/or an image signal processor. The processor 1910 may include at least part (e.g., a cellular module 1921) of the components shown in FIG. 19. The processor 1910 can load and process commands or data received from at least one of the other components (e.g., a nonvolatile memory) into a volatile memory, and store various data in the nonvolatile memory.

According to various example embodiments, the processor 1910 can control the operations of the electronic device 1901. The processor 1910 can include various processing circuitry including, for example, one or more processors. For example, the processor 1910 can include a CP, an AP, an interface (e.g., General Purpose Input/Output (GPIO)), or an internal memory, as separate components or can integrate them on one or more integrated circuits. According to an example embodiment, the AP can perform various functions for the electronic device 1901 by executing various software programs, and the CP can process and control voice communications and data communications. The processor 1910 can execute a particular software module (an instruction set) stored in the memory 1930 and thus carry out various functions corresponding to the module.

According to various example embodiments, the processor 1910 can control hardware modules such as the audio module 1980, the interface 1970, the display 1960, the camera module 1991, and the communication module 1920. The processor 1910 can be electrically connected with the display 1960 and the memory 1930 of the electronic device 1901.

According to various example embodiments, the processor 1910 can perform control to receive a plurality of images including a first image and a second image in a first order from an external electronic device using the communication interface functionally connected with the electronic device, to arrange the first image and the second image in a second order at least based on first property information corresponding to the first image and second property information corresponding to the second image, and to arrange and display the first image and the second image in the second order through the display functionally connected with the electronic device.

The processing (or controlling) operations of the processor 1910 are described by referring to the drawings.

The communication module 1920 may include various communication circuitry that can have the same or similar configuration to the communication interface 170 of FIG. 1. The communication module 1920 can include various communication circuitry, such as, for example, and without limitation, a cellular module 1921, a WiFi module 1923, a Bluetooth (BT) module 1925, a GNSS module 1927 (e.g., a GPS module, a Glonass module, a Beidou module, or a Galileo module), a Near Field Communication (NFC) module 1928, and a Radio Frequency (RF) module 1929.

The cellular module 1921 can provide, for example, voice call, video call, text service, or Internet service through a communication network. According to an example embodiment, the cellular module 1921 can identify and authenticate the electronic device 1901 in the communication network by using the SIM 1924 (e.g., a SIM card). The cellular module 1921 can perform at least part of a function which can be provided from the processor 1910. The cellular module 1921 can further include a CP.

The WiFi module 1923, the BT module 1925, the GNSS module 1927, or the NFC module 1928 each can include, for example, a processor for processing data transmitted and received through a corresponding module. According to an example embodiment, at least some (e.g., two or more) of the cellular module 1921, the WiFi module 1923, the BT module 1925, the GNSS module 1927, or the NFC module 1928 can be included in one Integrated Chip (IC) or an IC package.

The RF module 1929 can, for example, transmit and receive communication signals (e.g., RF signals). The RF module 1929 can include, for example, a transceiver, a Power Amp Module (PAM), a frequency filter, a Low Noise Amplifier (LNA), or an antenna. According to another embodiment, at least one of the cellular module 1921, the WiFi module 1923, the BT module 1925, the GNSS module 1927, or the NFC module 1928 can transmit and receive RF signals through a separate RF module.

The WiFi module 1923 can indicate a module for, for example, establishing a wireless Internet connection or a wireless LAN link with other external device (e.g., the another electronic device 102 or the server 106). The WiFi module 1923 can be installed inside or outside the electronic device 1901. Wireless Internet technologies can include WiFi, Wibro, World Interoperability for Microwave access (WiMAX), High Speed Downlink Packet Access (HSDPA), and millimeter Wave (mmWave). The WiFi module 1923 can transmit or receive various data of the electronic device 1901 to or from outside in association with other external device (e.g., the another electronic device 104) connected with the electronic device 1901 over a network (e.g., wireless Internet network) (e.g., the network 162). The WiFi module 1923 can be turned on all the time, or turned on/off according settings of the electronic device 1901 or a user input.

The BT module 1925 and the NFC module 1928 can indicate short-range communication modules for performing, for example, short range communication. Short-range communication techniques can include BT, Bluetooth Low Energy (BLE), Radio Frequency Identification (RFID), IrDA, Ultra Wide Band (UWB), ZigBee, and NFC. The short-range communication module can transmit or receive various data of the electronic device 1901 to or from outside in association with other external device (e.g., the another electronic device 102) connected with the electronic device 1901 over a network (e.g., a short-range communication network). The short-range communication module can be turned on all the time, or turned on/off according the settings of the electronic device or a user input.

The SIM 1924 can include, for example, a card including a SIM and/or an embedded SIM, and contain unique identification information (e.g., an Integrated Circuit Card Identifier (ICCID)) or subscriber information (e.g., an International Mobile Subscriber Identity (IMSI)).

The memory 1930 (e.g., the memory 130) can include, for example, an internal memory 1932 and/or an external memory 1934. The internal memory 1932 can include at least one of, for example, a volatile memory (e.g., Dynamic Random Access Memory (DRAM), Static RAM (SRAM), or Synchronous Dynamic RAM (SDRAM)), and a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, flash memory (e.g., NAND flash or NOR flash), hard drive, or Solid State Drive (SSD)).

The external memory 1934 can further include a flash drive, for example, Compact Flash (CF), Secure Digital (SD), micro SD, mini SD, extreme digital (xD), or memory stick. The external memory 1934 can be functionally and/or physically connected to the electronic device 1901 through various interfaces.

The sensor module 1940 can, for example, measure physical quantities or detect an operating state of the electronic device 1901, and thus convert the measured or detected information into electrical signals. The sensor module 1940, for example, can include at least one of a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H (e.g., a Red, Green, Blue (RGB) sensor), a biometric sensor 1940I, a temperature/humidity sensor 1940J, an illumination (e.g., light) sensor 1940K, and an Ultra Violet (UV) sensor 1940M. Additionally or alternately, the sensor module 1940 can include, for example, an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 1940 can further include a control circuit for controlling at least one sensor therein. According to an embodiment, the electronic device 1901 can further include, as part of the processor 1910 or individually, a processor configured to control the sensor module 1940 and thus control the sensor module 1940 while the processor 1910 is sleeping.

The input device 1950 can include various input circuitry, such as, for example, and without limitation, a touch panel 1952, a (digital) pen sensor 1954, a key 1956, or an ultrasonic input device 1958. The touch panel 1952 can use at least one of, for example, capacitive, resistive, infrared, and ultrasonic methods. Also, the touch panel 1952 may further include a control circuit. The touch panel 1952 can further include a tactile layer and provide a tactile response to the user.

The (digital) pen sensor 1954 can include, for example, part of a touch panel or a separate sheet for recognition. The key 1956 can include, for example, a physical button, a touch key, an optical key, or a keypad. The ultrasonic input device 1958 can detects ultrasonic waves from an input tool through a microphone (e.g., the microphone 1988) and thus obtain data corresponding to the detected ultrasonic waves. According to various embodiments, the input device 1950 can receive a force touch.

The display 1960 (e.g., the display 160) can include a panel 1962, a hologram device 1964, or a projector 1966.

The panel 1962 can include the same or similar configuration as the display 160 of FIG. 1. The panel 1962 can be implemented to be, for example, flexible, transparent, or wearable. The panel 1962 and the touch panel 1952 can be configured as one module. The panel 1962 can include a pressure sensor (or a force sensor) for measuring a pressure level of a user touch. The pressure sensor can be integrated with the touch panel 1952, or implemented as one or more sensors separately from the touch panel 1952. The panel 1962 can be mounted in the display 1960 and detect a user input which contacts or approaches a surface of the display 1960. The user input can include a touch input or a proximity input based on at least one of single-touch, multi-touch, hovering, and air gesture. The panel 1962 can receive a user input which initiates an operation for using the electronic device 1901, and generate an input signal according to the user input. The panel 1962 can convert a change such as pressure applied to a particular point of the display 1960 or capacitance generating at a particular portion of the display 1960, to an electrical input signal. The panel 1962 can detect a location or an area of an input means (e.g., a user finger, a digital pen, etc.) which touches or approaches the surface of the display 1960. The panel 1962 can also detect the pressure (e.g., force touch) of the touch according to the adopted touch method.

The hologram device 1964 can show three-dimensional images in the air by using interference of light. The projector 1966 can display an image by projecting light on a screen. The screen can be placed, for example, inside or outside the electronic device 1901. According to one embodiment, the display 1960 can further include a control circuit for controlling the panel 1962, the hologram device 1964, or the projector 1966.

The interface 1970 can include various interface circuitry, such as, for example, and without limitation, an HDMI 1972, a USB 1974, an optical interface 1976, or a D-sub-miniature (D-sub) 1978. The interface 1970 can be included in, for example, the communication interface 170 of FIG. 1. Additionally or alternately, the interface 1970 can include, for example, a Mobile High-Definition Link (MHL) interface, a SD card/MultiMedia Card (MMC) interface, or an Infrared Data Association (IrDA) standard interface.

The interface 1970 can receive data from an external device, or receive and forward power to the components of the electronic device 1901. The interface 1970 can send data of the electronic device 1901 to another electronic device. For example, the interface 1970 can include a wired/wireless headset port, an external charger port, a wired/wireless data port, a memory card port, an audio input/output port, a video input/output port, and an earphone port.

The audio module 1980, for example, can convert sounds into electrical signals and vice versa. At least some components of the audio module 1980 can be included in, for example, the input/output interface 150 of FIG. 1. The audio module 1980 can process sound information input or output through, for example, a speaker 1982, a receiver 1984, an earphone 1986, or the microphone 1988. The audio module 1980 can send an audio signal input from the processor 1910 to an output device (e.g., the speaker 1982, the receiver 184, or the earphone 1986), and forward an audio signal such as voice input from an input device (e.g., the microphone 1988) to the processor 1910. Under control of the processor 1910, the audio module 1980 can convert voice/sound data to an audible sound, output the audible sound through the output device, convert an audio signal such as voice received from the input device to a digital signal, and send the digital signal to the processor 1910.

The speaker 1982 or the receiver 1984 can output audio data received from the communication module 1920 or stored in the memory 1930. The speaker 1982 or the receiver 1984 may output sound signals relating to various operations (functions) performed by the electronic device. The microphone 1988 can receive and process an external sound signal as electric voice data. Various noise reduction algorithms can be applied to the microphone 1988 to eliminate and/or reduce noises generating in the input external sound signal. The microphone 1988 can receive an audio streaming such as a voice command.

The camera module 1991 is, for example, a device for capturing still images and moving images. According to an example embodiment, the camera module 1991 can include one or more image sensors (e.g., a front sensor or a rear sensor), a lens, an Image Signal Processor (ISP), or a flash (e.g., an LED or a xenon lamp).

According to various example embodiments, the camera module 1991 supports a camera function of the electronic device 1901. Under control of the processor 1910, the camera module 1991 can capture a subject and send the captured data (e.g., image) to the display 1960 and the processor 1910. The camera module 1991 can include, for example, a first camera (e.g., a color (RGB) camera) for obtaining color information and a second camera (e.g., an IR camera) for obtaining depth information (e.g., location information, distance information of a subject). The camera module 1991 can include an image sensor. The image sensor can be implemented using a Charged Coupled Device (CCD) or a Complementary Metal-Oxide Semiconductor (CMOS), or the like, without limitation. The first camera can be a front camera on a front side of the electronic device 1901. The front camera can be replaced by the second camera, and may not be disposed in the front side of the electronic device 1901. The first camera can be disposed on the front side of the electronic device 1901 together with the second camera. The first camera can be a rear camera on a rear side of the electronic device 1901. The first camera can include both of the front camera and the second camera on the front side and the rear side respectively of the electronic device 1901.

The power management module 1995, for example, can manage the power of the electronic device 1901. According to an example embodiment, the power management module 1995 can include a Power Management IC (PMIC), a charger IC, or a battery or fuel gauge. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier. The battery gauge, for example, can measure the remaining capacity of the battery 1996, a voltage, currents, or temperature of the battery 1996 during charging. The battery 1996 can include, for example, a rechargeable battery and/or a solar battery.

The indicator 1997 can display a specific state of the electronic device 1901 or part thereof (e.g., the processor 1910), for example, a booting state, a message state, or a charging state. The motor 1998 can convert electrical signals into mechanical vibration and generate a vibration or haptic effect. Although not depicted, the electronic device 1901 can include a processing device (e.g., a GPU) for supporting mobile TV. The processing device for supporting mobile TV, for example, can process media data according to standards such as Digital Multimedia Broadcasting (DMB), Digital Video Broadcasting (DVB), or media flow.

Each of the above-described components of the electronic device can be configured with one or more components, and the name of a corresponding component can vary according to a type of an electronic device. According to various example embodiments, the electronic device can be configured to include at least one of the above-described components, omit some components, or further include an additional component. Also, some of the components of the electronic device according to various example embodiments can be combined as one entity and thus identically perform the functions of the corresponding components.

Figure 20:
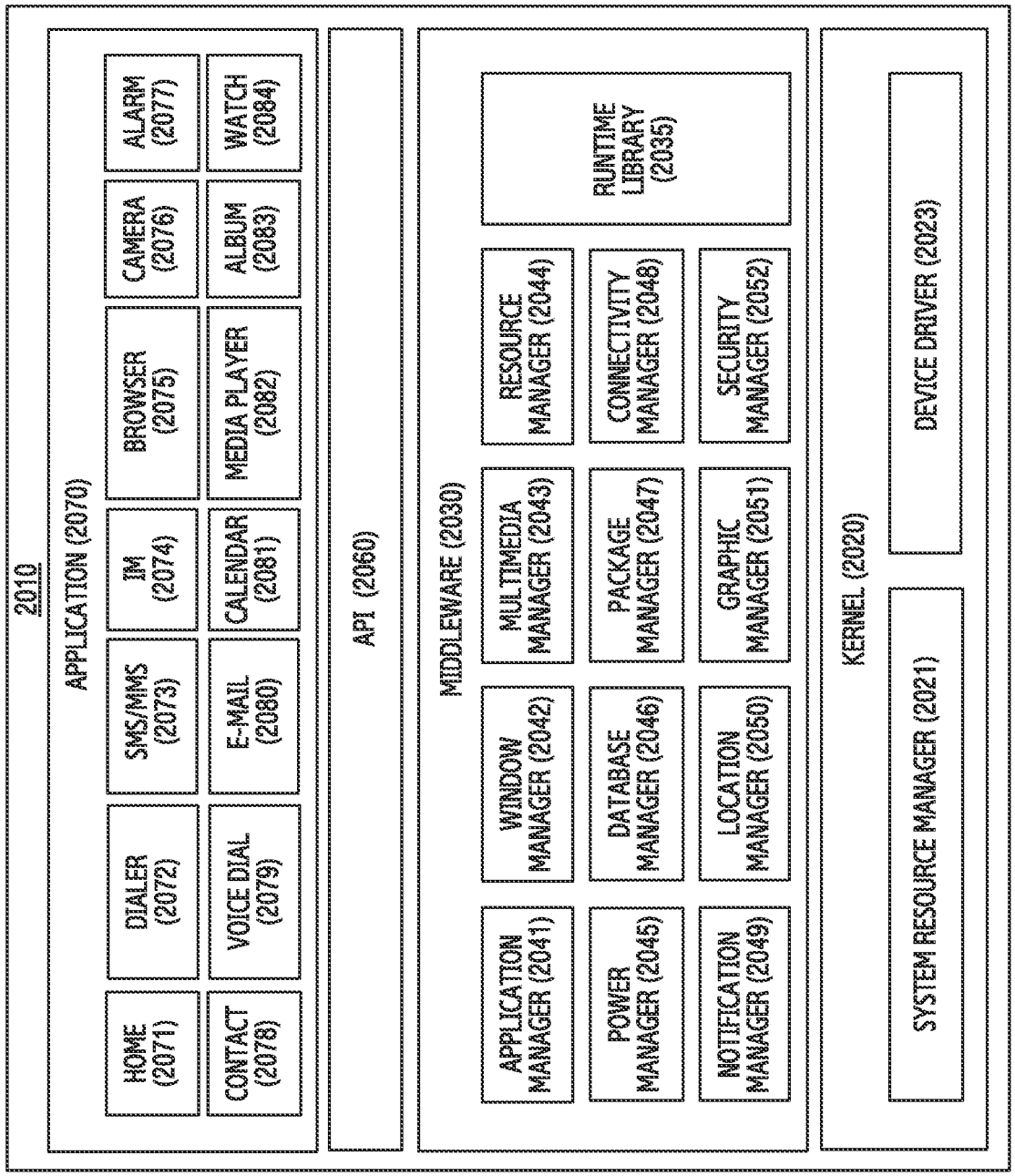
FIG. 20 is a block diagram illustrating an example program module according to various example embodiments of the present disclosure.

FIG. 20 is a block diagram illustrating an example program module according to various embodiments.

According to one embodiment, the program module 2010 (e.g., the program 140) can include an OS for controlling resources relating to an electronic device (e.g., the electronic device 101) and/or various applications (e.g., the application program 147) running on the OS. The OS can include, for example, Android™, iOS™, Windows™, Symbian™, Tizen™, or Samsung Bada™ OS.

The program module 2010 can include a kernel 2020, a middleware 2030, an API 2060, and/or an application 2070. At least part of the program module 2010 can be preloaded on the electronic device or downloaded from the external electronic device (e.g., the electronic device 102 or 104, the server 106).

The kernel 2020 (e.g., the kernel 141) can include, for example, a system resource manager 2021 and/or a device driver 2023. The system resource manager 2021 can control, allocate, or retrieve a system resource. According to one embodiment, the system resource manager 2021 can include a process management unit, a memory management unit, or a file system management unit. The device driver 2023 can include, for example, a display driver, a camera driver, a Bluetooth driver, a sharing memory driver, a USB driver, a keypad driver, a WiFi driver, an audio driver, or an Inter-Process Communication (IPC) driver.

The middleware 2030, for example, can provide a function commonly required by the application 2070 or provide various functions to the application 2070 through the API 2060 so that the application 2070 can efficiently use limited system resources inside the electronic device. According to an example embodiment, the middleware 2030 (e.g., the middleware 143) can include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, and a security manager 2052.

The runtime library 2035 can include, for example, a library module used by a complier to add a new function through a programming language while the application 2070 is running. The runtime library 2035 can manage input/output, memory, or arithmetic function.

The application manager 2041, for example, can manage a life cycle of at least one of the applications 2070. The window manager 2042 can manage a Graphical User Interface (GUI) resource used in a screen. The multimedia manager 2043 can recognize a format for playing various media files, and encode or decode a media file by using the codec of a corresponding format. The resource manager 2044 can manage a source code of at least one of the application 2070, and the resources such as memory or storage space.

The power manager 2045 can manage the battery or the power by operating with, for example, Basic Input/Output System (BIOS), and provide power information for the operation of the electronic device. The database manager 2046 can create, search, or modify a database to be used by at least one of the application 2070. The package manager 2047 can manage installation or updating of an application distributed in a package file format.

The connectivity manger 2048 can manage, for example, a wireless connection such as WiFi or Bluetooth. The notification manager 2049 can display or notify an event such as incoming message, appointment, and proximity alert, to the user not to interrupt the user. The location manager 2050 can manage location information of the electronic device. The graphic manager 2051 can manage a graphic effect to be provided to the user or a user interface relating thereto. The security manager 2052 can provide all security functions for system security or user authentication. According to one embodiment, when the electronic device (e.g., the electronic device 101) includes a telephone function, the middleware 2030 can further include a telephony manager for managing a voice or video call function of the electronic device.

The middleware 2030 can include a middleware module for combining various functions of the above-described components. The middleware 2030 can provide a module specialized for each type of the OS to provide a distinguished function. Also, the middleware 2030 can dynamically delete part of the existing components or add new components.

The API 2060 (e.g., the API 145), as a set of API programming functions, can be provided as a different configuration according to the OS. For example, Android or iSO can provide one API set for each platform, and Tizen can provide two or more API sets for each platform.

The application 2070 (e.g., the application program 147) can include, for example, applications of a home 2071, a dialer 2072, an SMS/Multimedia Messaging System (MMS) 2073, an Instant Message (IM) 2074, a browser 2075, a camera 2076, an alarm 2077, a contact 2078, a voice dial 2079, an e-mail 2080, a calendar 2081, a media player 2082, an album 2083, or a watch 2084. According to various example embodiments, the application 2070 can include one or more applications for health care (e.g., measure an exercise amount or blood sugar level) or environmental information provision (e.g., provide air pressure, humidity, or temperature information).

According to an example embodiment, the application 2070 can include an application (hereafter, for the understanding, referred to as an information exchange application) for supporting information exchange between the electronic device (e.g., the electronic device 101) and the external electronic device (e.g., the electronic device 102 or 104). The information exchange application can include, for example, a notification relay application for relaying specific information to the external device or a device management application for managing the external electronic device.

For example, the notification relay application can forward notification information generated from another application (e.g., the SMS/MMS application, the email application, the health care application, or the environmental information provision application) of the electronic device to the external electronic device (e.g., the electronic device 102 or 104). Also, the notification relay application, for example, can receive and forward notification information from the external electronic device to the user.

The device management application, for example, can manage (e.g., install, delete, or update) at least one function (e.g., turn-on/turn off of the external electronic device itself (or some components) or display brightness (or resolution) adjustment) of the external electronic device (e.g., the electronic device 102 or 104) communicating with the electronic device, an application operating in the external electronic device, or a service (e.g., call service or message service) provided from the external electronic device.

According to an example embodiment, the application 2070 can include a designated application (e.g., a health care application of a mobile medical device) according to a property of the external electronic device (e.g., the electronic device 102 or 104). According to an example embodiment, the application 2070 can include an application received from the external electronic device (e.g., the server 106 or the electronic device 102, 104). According to an example embodiment, the application 2070 can include a preloaded application or a third party application which can be downloaded from the server. The names of the components of the program module 2010 according to the example embodiment can vary according to the type of the OS.

According to various example embodiments, at least part of the program module 2010 can be implemented with software, firmware, hardware (e.g., circuitry), or a combination of at least two of them. At least part of the program module 2010 can be implemented with, for example, a processor (e.g., the processor 1910). At least part of the program module 2010 can include, for example, a module, a program, a routine, sets of instructions, or a process for executing one or more functions.

The term "module" as used in the present disclosure can refer, for example, to a unit including hardware (e.g., circuitry), software, firmware, or a combination of one or two or more of them. "module" can be interchangeably used with terms, for example, such as "unit", "logic", "logical block", "component", "circuit", and the like. "module" can be a minimum unit of an integral component or can be a part thereof "module" can be a minimum unit for performing one or more functions or a part thereof "module" can be mechanically or electrically implemented. For example, "module" can include at least one of processing circuitry, an Application-Specific Integrated Circuit (ASIC) chip, a Field-Programmable Gate Arrays (FPGAs), or a programmable-logic device, which are known or will be developed, for performing certain operations.

At least part of a device (e.g., modules or functions thereof) or a method (e.g., operations) according to various example embodiments can be implemented with, for example, instructions stored in a computer-readable storage medium as a program module. When the instruction is executed by a processor (e.g., the processor 120 of FIG. 1 or the processor 410 of FIG. 4), one or more processors can perform a function corresponding to the instruction. The computer readable recording medium can be, for example, the memory 130.

The computer-readable recording medium can include a hard disk, a floppy disk, magnetic media (e.g., a magnetic tape), optical media (e.g., a CD-ROM, a DVD), magneto-optical media (e.g., a floptical disk), and hardware devices (e.g., a ROM, a RAM, or a flash memory). A program instruction can include not only machine code made by a compiler but also high-level language code executable by a computer using an interpreter. The above-stated hardware device can serve as one or more software modules for fulfilling the operations of various embodiments, and vice versa.

According to various example embodiments, in a storage medium storing instructions, the instructions, when executed by at least one processor, cause the at least one processor execute at least one operation. The at least one operation in an electronic device can include receiving a plurality of images including a first image and a second image in a first order from an external electronic device using a communication interface functionally coupled to the electronic device, arranging the first image and the second image in a second order at least based on first property information corresponding to the first image and second property information corresponding to the second image, and arranging and displaying the first image and the second image in the second order through a display functionally coupled to the electronic device. In a storage medium storing instructions, the instructions, when executed by at least one processor, cause the at least one processor execute at least one operation. The at least one operation in an electronic device including a memory for storing a plurality of images including a first image and a second image, can include arranging the first image and the second image in a first order at least based on first property information corresponding to the first image and second property information corresponding to the second image, and sending the first image and the second image in the first order to an external electronic device using a communication interface.

A module or a program module according to various example embodiments can include at least one or more of the aforementioned components, omit some of them, or further include additional other components. Operations performed by a module, a program module, or other components according to various example embodiments can be executed in a sequential, parallel, repetitive, or heuristic manner. In addition, some operations can be executed in a different order or be omitted, or other operations can be added.

As set forth above, the user can send a plurality of images to another party in his/her intended order. Image files are arranged and transmitted to the other party in the display order based on the property of the image file (e.g., page number, time information (e.g., captured time, created time), location (place) information, file name, object movement (e.g., scene) information in the image, as the property indicating the order). The recipient can easily obtain meanings of the image files without having to change the order of the received image files.

Other effects which may be obtained or expected from the example embodiments of the present disclosure are explicitly or implicitly disclosed in the detailed description of the present disclosure.

While the disclosure has been illustrated and described with reference to certain example embodiments thereof, it will be understood by those skilled in the art that various changes in form and details may be made therein without departing from the spirit and scope of the disclosure as defined by the appended claims and their equivalents.

What is claimed is:
1. An electronic device comprising:
a display;
a communication interface comprising interface circuitry; and
at least one processor,
wherein the processor is configured to:

receive, via a messaging service, a plurality of multimedia data from an external electronic device via the communication interface, the plurality of multimedia data comprising a first and second images corresponding to first and second multimedia data;

cause to display a plurality of images corresponding to the plurality of multimedia data, respectively, via the display in a single bubble of a user interface (UI) based at least on a messaging application; and in response to an input selecting the bubble comprising the plurality of images, cause to display the plurality of images in an enlarged manner via the display so that the plurality of images are displayed in a size larger than a size in which the images were displayed in the bubble;

wherein the at least one processor is configured to cause the plurality of images to be displayed in the bubble in a manner based on an order in which the plurality of images were received or based on property information of the plurality of images, the property information being for defining a display order of the plurality of images.

2. The electronic device of claim 1, wherein the plurality of multimedia data further comprises third multimedia data, a third image corresponding to the third multimedia data.

3. The electronic device of claim 2, wherein the at least one processor is further configured to cause to display the first, second and third images in the single bubble of the user interference (UI) based at least on the messaging application, and in response to the input selecting the bubble comprising the first, second and third images, cause to display the first, second and third images in an enlarged manner via the display so that the first, second and third images are displayed in a size larger than a size in which the images were displayed in the bubble.

4. The electronic device of claim 2, wherein the input is a selection of at least one of the images in the bubble.

5. The electronic device of claim 1, wherein the at least one processor is configured to cause the plurality of images to be displayed as thumbnail images in the bubble.

6. The electronic device of claim 1, wherein the bubble comprises information indicating a number of the plurality of images.

7. The electronic device of claim 1, wherein no images in the bubble overlap each other.

8. The electronic device of claim 1, wherein the input is a touch selection touching at least part of the bubble, or a selection via a key separate from the bubble.

9. A method of operating an electronic device, the method comprising:

receiving, via a messaging service, a plurality of multimedia data from an external electronic device via a communication interface, the plurality of multimedia data comprising a first and second images corresponding to first and second multimedia data;

displaying a plurality of images corresponding to the plurality of multimedia data, respectively, in a single bubble of a user interface (UI) via a display based at least on a messaging application; and in response to an input selecting the bubble comprising the plurality of images, displaying the plurality of images in an enlarged manner via the display so that the plurality of images are displayed in a size larger than a size in which the images were displayed in the bubble;

wherein the plurality of images are displayed in the bubble in a manner based on an order in which the plurality of images were received or based on property information of the plurality of images, the property information being for defining a display order of the plurality of images.

10. The method of claim 9, wherein the plurality of multimedia data further comprises third multimedia data, a third image corresponding to the third multimedia data.

11. The method of claim 10, further comprising displaying the first, second and third images in the single bubble of the user interference (UI) based at least on the messaging application, and in response to the input selecting the bubble comprising the first, second and third images, displaying the first, second and third images in an enlarged manner so that the first, second and third images are displayed in a size larger than a size in which the images were displayed in the bubble.

12. The method of claim 9, wherein the input is a selection of at least one of the images in the bubble.

13. The method of claim 9, wherein no images in the bubble overlap each other.

14. The method of claim 9, wherein the input is a touch selection touching at least part of the bubble, or a selection via a key separate from the bubble.

15. The method of claim 9, wherein the bubble comprises information indicating a number of the plurality of images.

16. A non-transitory computer-readable recording medium having recorded thereon a program which when executed by a processor, causes the processor to perform operations comprising:

receiving, via a messaging service, a plurality of multimedia data from an external electronic device via a communication interface, the plurality of multimedia data comprising first and second multimedia data;

displaying a plurality of images corresponding to the plurality of multimedia data, respectively, in a single bubble of a user interface (UI) via a display based at least on a messenger application; and in response to an input selecting the bubble comprising the plurality of images, displaying the plurality of images in an enlarged manner via the display so that the plurality of images are displayed in a size larger than a size in which the images were displayed in the bubble;

wherein the plurality of images are displayed in the bubble in a manner based on an order in which the plurality of images were received or based on property information of the plurality of images, the property information being for defining a display order of the plurality of images.

* * * * *